United States Patent
Drevet et al.

(10) Patent No.: US 12,466,740 B2
(45) Date of Patent: Nov. 11, 2025

(54) MAGNESIUM OXIDE BASED PRODUCTS AND CONTINUOUS PROCESS PRODUCTION THEREOF

(71) Applicant: Shaw Industries Group, Inc., Dalton, GA (US)

(72) Inventors: Anthony Drevet, Ringgold, GA (US); Christopher K. Andrews, Signal Mountain, TN (US); Patrick Sterling Eckman, Chattanooga, TN (US)

(73) Assignee: Shaw Industries Group, Inc., Dalton, GA (US)

( * ) Notice: Subject to any disclaimer, the term of this patent is extended or adjusted under 35 U.S.C. 154(b) by 67 days.

(21) Appl. No.: 18/481,075

(22) Filed: Oct. 4, 2023

(65) Prior Publication Data

US 2024/0116768 A1    Apr. 11, 2024

Related U.S. Application Data

(60) Provisional application No. 63/412,949, filed on Oct. 4, 2022.

(51) Int. Cl.
    *C01F 5/02*    (2006.01)
(52) U.S. Cl.
    CPC ..................... *C01F 5/02* (2013.01)
(58) Field of Classification Search
    CPC ........................................ C01F 5/02
    See application file for complete search history.

(56) References Cited

U.S. PATENT DOCUMENTS

| | | | |
|---|---|---|---|
| 2007/0270070 A1 | 11/2007 | Hamed | |
| 2008/0314296 A1* | 12/2008 | Wisenbaker, Jr. | .. B28B 23/0006 106/801 |
| 2013/0115412 A1 | 5/2013 | Padmanabhan | |
| 2020/0131297 A1 | 4/2020 | Tsuchiya et al. | |
| 2023/0079984 A1* | 3/2023 | Clement | ................ D21H 27/18 162/129 |

OTHER PUBLICATIONS

The International Search Report/Written Opinion released by the U.S. Receiving Office on Jan. 31, 2024 for corresponding PCT application No. PCT/US2023/075982; 10 pages.

* cited by examiner

*Primary Examiner* — Austin Murata
(74) *Attorney, Agent, or Firm* — Smith Gambrell & Russell LLP

(57) ABSTRACT

A continuous process of forming a magnesium oxide-based product. The process includes preparing a feedstock, transferring the feedstock to a continuous curing process occurring at elevated temperatures and pressures, and drying the product of the continuous curing process. The process can further include lamination processes occurring after drying or in conjunction with curing. The continuous process reduces costs and times associated with traditional processes.

22 Claims, 7 Drawing Sheets

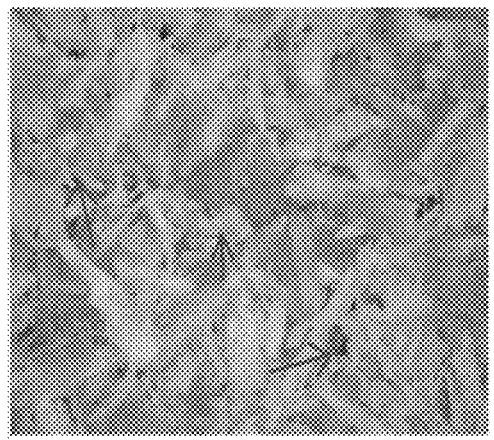
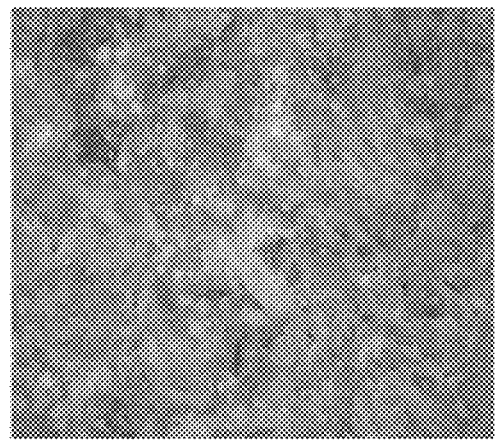
FIG. 6A        FIG. 6B
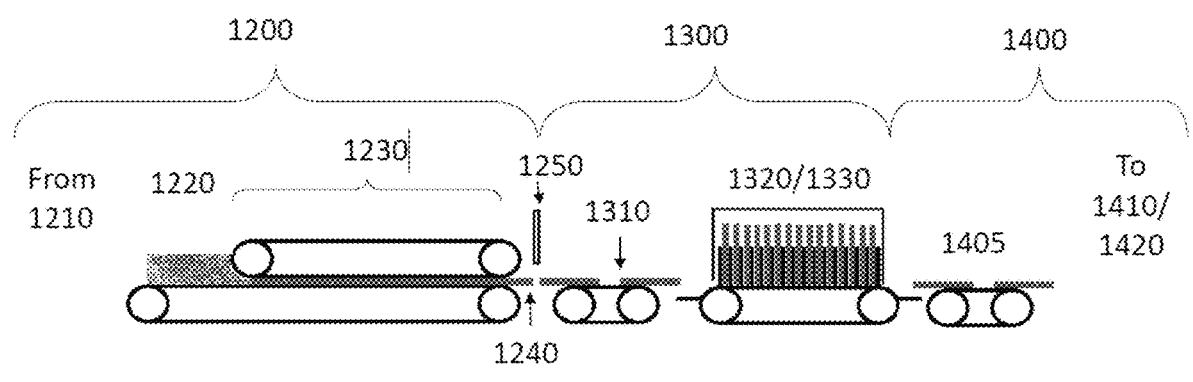
FIG. 7

MAGNESIUM OXIDE BASED PRODUCTS AND CONTINUOUS PROCESS PRODUCTION THEREOF

TECHNICAL FIELD

This disclosure relates to magnesium oxide-based products, methods of magnesium oxide-based products, and continuous process production thereof.

BACKGROUND

Magnesium oxide (MgO) based products have been used in a variety of industries for their inherent water-resistant properties that offer advantages to applications where water-based damage may serve as a serious problem, as well as their superior fire resistance properties.

SUMMARY

It is to be understood that this summary is not an extensive overview of the disclosure. This summary is example and not restrictive and it is intended to neither identify key or critical elements of the disclosure nor delineate the scope thereof. The sole purpose of this summary is to explain and exemplify certain concepts of the disclosure as an introduction to the following complete and extensive detailed description.

The present disclosure relates to a method for producing a magnesium oxide (MgO) based product. This product includes but is not limited to an MgO core. The method includes an accelerated curing process that greatly reduces the time necessary to make an MgO based product.

The present disclosure relates to a method that includes preparing a feedstock. In an aspect, a feedstock includes MgO, a salt, water, and a selection of fibers. Fibers are selected from a variety of fibers of various lengths, thicknesses, and materials including but not limited to wood fibers, bamboo fibers, cellulosic fibers, hemp fibers, natural fibers, pecan fibers, synthetic fibers, and any combinations thereof. More than one fiber type may be used in a selection of fibers. A feedstock may also include additives. The present disclosure also relates to methods where multiple feedstocks of different compositions (e.g. different amounts of MgO, salt, water, fibers, etc. and different selections of fibers) are prepared in order to make an MgO core.

The present disclosure relates to a curing process, which is accelerated compared to traditional curing processes. In an aspect, the curing process described herein is a continuous process that occurs using simultaneously elevated temperatures and pressures. In an aspect, temperatures range from about 155° F. up to about 310° F., and pressures range from about 3 MPa up to about 13 MPa (per square inch), about 2 MPa up to about 4 MPa, or about 4 MPa up to about 10 MPa. The curing process can take place within about 3 minutes up to about 60 minutes and produces a product with a moisture content of about 4% up to about 20%. Depending on the combination of the temperature, pressure, as well as moisture content in the product, the curing processing time can vary. In one aspect, the curing time can be under sixty minutes at a lower elevated temperature (e.g., around 155° F.). In another aspect, at 180 F, the curing time may be 30 min, while at 250 F, the curing time can be 3 min depending on how much water is in the mixture. If there is too much water, then it can cause bubbles (it may boil) and create boil ripples in the board which is not desirable.

The curing process can occur on or within a variety of machines configured to supply elevated temperatures and pressures including but not limited to a double-belt press. An MgO-based product (e.g., MgO core) emerging from the curing process can undergo subsequent drying to reach a moisture content of about 4% up to about 13%. An MgO-based product may range in thickness from about 3 mm up to about 15 mm. As a non-limiting example, an MgO-based product may range in thickness from about 7 mm up to about 9 mm.

The present disclosure further relates to a process for applying one or more outer layers to an MgO core. Outer layers include but are not limited to laminates, wood veneer, melamine, phenolic resin papers, melamine-impregnated phenolic resin paper, vinyl, digital printed ink, urethane coatings, stain coatings, and other such materials. In an aspect, the process includes applying one or more outer layers to one or more sides of an MgO-based product. The process can occur after a drying process, or outer layers can be applied simultaneously during a curing process. In the latter, one or more outer layers would be placed on one or more sides of an MgO-based product prior to curing and then be applied or bonded to the MgO-based product at the same time as the curing process.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIGS. 6A-6B display an example of a product without (FIG. 6A) and with (FIG. 6B) powder according to one or more example aspects of the present disclosure.

FIG. 7 is a schematic representation of an example of machinery to be used according to one or more example aspects of the present disclosure.

DETAILED DESCRIPTION

Figure 1:
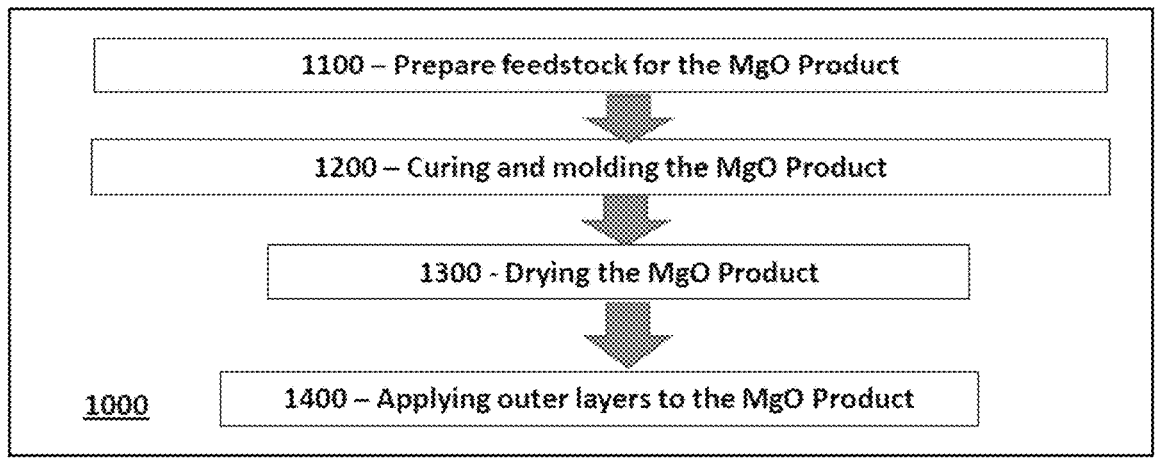
FIG. 1 illustrates an example of a continuous process for preparing an MgO product according to one or more example aspects of the present disclosure.

It should be appreciated that this disclosure is not limited to the compositions and methods described herein. It is also to be understood that the terminology used herein is for the purpose of describing certain embodiments only, and is not intended to be limiting, since the scope of the present disclosure will be limited only by the appended claims.

I. Definitions

Unless defined otherwise, all technical and scientific terms used herein have the same meaning as commonly understood by one of ordinary skill in the art to which this disclosure belongs. Although any compositions, methods and materials similar or equivalent to those described herein can be used in the practice or testing of the present disclosure. All publications mentioned are incorporated herein by reference in their entirety.

Unless defined otherwise, all composition percentage values used herein are given in terms of weight percentage.

The use of the terms "a," "an," "the," and similar referents in the context of describing the presently claimed disclosure (especially in the context of the claims) are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein.

Use of the term "about" is intended to describe values either above or below the stated value in a range of approx. +/−15%; in other embodiments the values may range in value either above or below the stated value in a range of approx. +/−10%; in other embodiments the values may range in value either above or below the stated value in a range of approx. +/−5%; in other embodiments the values may range in value either above or below the stated value in a range of approx. +/−2%; in other embodiments the values may range in value either above or below the stated value in a range of approx. +/−1%. The preceding ranges are intended to be made clear by context, and no further limitation is implied. All methods described herein can be performed in any suitable order unless otherwise indicated herein or otherwise clearly contradicted by context. The use of any and all examples, or example language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

As used herein, "cement" refers to adhesive substances that form through a variety of hardening processes, setting to hard masses. Cement formation may create a "cement matrix" that may include pores, voids, or gaps formed during the cement formation. As non-limiting examples, hardening processes may include curing. Degrees of setting and hardening may depend on levels of hydration in a mixture undergoing hardening processes. Formation of a cement may come from the reaction of a mineral material and salt in the presence of water. Such cement-forming reactions may produce various yields depending on reaction parameters known in the art including but not limited to temperature, time, humidity, pressure, and the like. As a non-limiting example, MgO, $MgSO_4$, limestone, and other such materials reacting in the presence of water may form a cement.

As used herein, a "curing process" is a process during which a chemical reaction occurs to form a cement, resulting in a product with desired qualities (e.g., harder, tougher, more stable, more readily processed in subsequent processes, etc.). Chemical reactions may occur between a mineral material and a salt of choice in the presence of water. An example mineral material includes but is not limited to MgO. Some salts may also be considered mineral materials. Some curing processes may require maintenance of certain temperatures, pressures, humidity levels, and other important process parameters.

As used herein, "moisture content" refers to the weight percentage of moisture within a tested sample. The associated test method includes drying a given sample in an oven. For example, drying the sample in an oven for about 24 hours at 212° F. The weight of the sample is taken at the beginning and end of drying and compared to calculate the percentage of the initial weight that was lost during drying. This is said to be the moisture content of the original sample.

As used herein, "process parameters" may refer to characteristics of a process that can be said to have an effect on qualities of the final product. Such qualities may comprise moisture content, rigidity, tensile strength, water resistance, and other appropriate qualities. Example process parameters may comprise, but are not limited to, temperature, pressure, humidity, order of mixing raw materials, time of process.

As used herein, a "salt" refers to an ionic compound made up of two groups of oppositely charged ions (i.e. cations and anions). The cationic and anionic ions must be present in such a ratio as to provide the salt with an overall electrical charge of zero (i.e. an equal balance between positive charge and negative charge). Salts may be used herein during curing processes where a salt may react with MgO in the presence of water. Non-limiting examples of salts include magnesium chloride ($MgCl_2$), Magnesium Sulfate ($MgSO_4$), and other such salts.

As used herein, "dimensional stability" refers to the ability of a MgO-based product to retain its shape (e.g. flatness), rigidity, strength, and other such desired properties in the presence of stressors. Stressors include but are not limited to extreme temperatures, water contact, elevated pressures, and the like. A product with poor dimensional stability may warp or fail in the presence of aforementioned stressors, whereas a product with good or high dimensional stability will maintain its shape (e.g. flatness), rigidity, strength, and the like in the presence of said stressors.

As used herein, "yield" or "percent yield" refers to the amount of actual product formed through a chemical reaction in relation to the amount of product that could have been theoretically formed given the quantity of reactants reacted. The amount of product that could have been theoretically formed can be calculated through stoichiometric coefficients relating to a given reaction, whereas the amount of actual product formed may be measured. The general formula for "yield" or "percent yield" is $$\text{yield} = \frac{\text{actual yield}}{\text{theoretical yield}} * 100\%.$$

II. Current Processes of Manufacturing a Magnesium Oxide Product

MgO-based products are currently manufactured in a batch-like process where a MgO wet or dry composition is first placed into molds and then allowed to cure via a reaction between MgO and a salt (e.g., magnesium chloride ($MgCl_2$)) with a total production time typically ranging from 36 hours to 156 hours for all associated processes (e.g., curing, moisture maintenance, drying) depending on the desired product. The MgO product must remain in the mold for the entirety of the curing time to allow cement formation via the aforementioned reaction to ensure the product has the required strength before being removed from the mold to undergo further processes. The curing time monopolizes the use of these molds, resulting in a bottleneck for the overall MgO product forming process using current batch process methods known in the art. In addition, the curing step necessitates a large amount of space in plants to place the molds before the products can be removed.

Attempts have been made to speed up the curing reaction of the MgO composition via elevating either temperature or pressure. However, water must be available to facilitate an effective reaction of MgO and the salt of choice. These attempts to elevate either pressure or temperature lead to a decreasing amount of water during the curing process, which yields undesirable products (e.g. brittle, non-resistant to moisture, etc.). Curing processes using a feedstock with a high water content (i.e. a slurry) have been traditionally cured at low temperatures and pressures. In order to speed curing of a slurry, water must be removed as fast as possible (i.e. with high temperatures) during curing, resulting in an incomplete reaction and leading to poor cement formation. Poor cement formation may lead to a brittle board that may crack under pressure. In traditional processes using dry feedstocks, cement formation during curing does not sufficiently occur. This has been combatted by adding more fibers and using high pressures while keeping the temperature low. If high temperatures were to be utilized with a low water content process, air pockets may form due to water evaporation, thus reducing the board's strength and rigidity. In both processes, a combination of high temperatures and high pressures have not been successfully used.

The curing process is frequently followed by a drying process (i.e., to let water evaporate or escape the panel) that may range from 1 hours to 24 hours before the MgO core is ready to undergo further steps, such as the application of one or more outer layers (e.g., applying or adhering a top layer (e.g., laminate, décor, wear, etc.) to the MgO core) via hot pressing. The drying step allows for the manufacturer to control the desired moisture content of the final product, and more specifically the desired moisture content of the MgO core. As a non-limiting example, controlling the desired moisture content is important when the MgO core must undergo additional processing. Additional processing may include the addition of one or more outer layers including but not limited to a laminate applied via elevated temperature and pressure. As a non-limiting example, control of desired moisture content is important when the MgO core is to be used in applications requiring high dimensional stability. Such an application may include but is not limited to floated flooring applications utilizing locking systems. Applications that do not require an MgO core to undergo additional processing may not require as specific of a level of control over moisture content, though reducing moisture content via drying is still desired.

Attempts at accelerating individual steps (e.g., curing, drying, etc.) by raising both temperature and pressure simultaneously have not been made. This is a result of the negative effects seen as a result of raising either temperature or pressure, making it undesirable to attempt to raise both simultaneously. However, the present disclosure outlines some benefits of such a change to the traditional MgO process.

III. Continuous Process Manufacturing of a Magnesium Oxide Product

The present disclosure can be understood more readily by reference to the following detailed description, examples, drawings, and claims, and their previous and following description. However, before the present compositions, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The present disclosure relates to a continuous process 1000 of manufacturing a magnesium oxide (MgO) based product 100. In such an aspect, example process steps include, but are not limited to, preparing a feedstock (step 1100) for the MgO product, curing (step 1200) the MgO product, drying (step 1300) the MgO product, and applying one or more outer layers (step 1400) to the MgO product, as shown in FIG. 1. The last step encompasses adding one or more outer layers to the MgO product 100. Such outer layers include, but are not limited to laminate, wood veneer, melamine, phenolic resin paper, melamine-impregnated phenolic resin paper, vinyl, digital printed ink (with or without a base primer coating), urethane coating, stain coating, and other such materials. One or more outer layers may be applied during or after a curing process 1200 and/or after a drying process 1300.

The continuous process 1000 presents a significant improvement over the batch process of manufacturing such products as known in the art. In an aspect, the continuous process 1000 greatly reduces the time, space, and cost required to manufacture MgO-based products, including the possibility of performing some of the outlined steps above at the same time. In such aspects, time, space, and cost requirements are reduced by replacing batch process steps that occur on the magnitude of several hours or days with continuous variations of such steps occurring on the scale of minutes.

Figure 2:
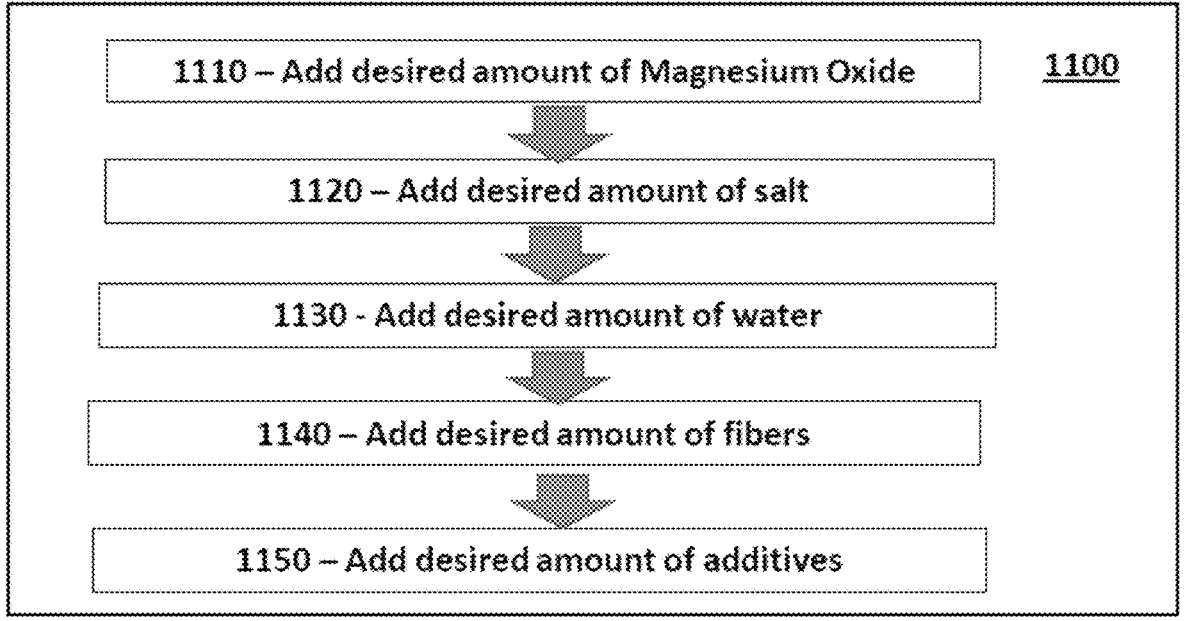
FIG. 2 illustrates an example of a feedstock preparation process according to one or more example aspects of the present disclosure.

In an aspect, the continuous process 1000 includes preparing a feedstock (step 1100). In an aspect, preparing the feedstock includes selecting: MgO (step 1110), a salt (step 1120), an amount of water (step 1130), fibrous components (step 1140), and any necessary additives (step 1150), as shown in FIG. 2. The preparation of a feedstock does not necessarily have to occur in the order presented in FIG. 2 and can be re-arranged. That is, each component can be prepared at different times.

The composition of the feedstock (steps 1110-1150) is chosen to have desired properties. Such properties include, but are not limited to, desired reaction yields, ideal water absorption characteristics (e.g., substantially all water is absorbed into components of the feedstock, as described below), the ability to undergo further processing, and the like. In such aspects, selecting ideal MgO formulations (e.g. particulate sizes) and salts may allow for desired reaction yields, wherein a reaction between MgO and a salt in the presence of water yields a cement. In addition, fiber compositions may be selected to give ideal water absorption characteristics. In such aspects, fiber compositions may also influence the ability of a feedstock to undergo further processing, such as an application of one or more outer layers (step 1400). Further, specific fiber compositions may influence and/or positively affect the strength (e.g., increase tensile strength) of the MgO core. The composition of the feedstock may also be chosen to determine desired properties of a final product 100. In such an aspect, preparing the feedstock (step 1100) can be done to provide a product 100 with properties including, but not limited to, rigidity, water resistance (to absorption and swelling via the MgO product), surface smoothness, and other such properties. These and other features are discussed in detail below.

The selection of the MgO (step 1110) and the salt (step 1120) plays an important part in the overall process. The MgO and salt of the feedstock will undergo a chemical reaction via a curing process (in the presence of water to form a cement, discussed in more detail below) to give the final product 100 rigidity and durability. Additional side reactions may also occur during the curing process, such as a reaction between MgO and water, that can form noncement materials. Such side reactions may be less desirable than cement-forming reactions. In order to increase the yield of the cement-forming reaction, the MgO will typically be in powdered forms (step 1110). Such a selection will allow for the MgO to sufficiently react with the salt in the presence of water during the curing to form a cement strong enough to hold the rigid board together (retain a board shape). The salt can be selected from one or more of a variety of salts known in the art including, but not limited to, magnesium chloride ($MgCl_2$), magnesium sulfate (MgSO4), and the like (step 1120). In some examples, the salt can be magnesium phosphate.

In an aspect, the composition of the feedstock may be developed to include a fine particulate MgO-based powder. The choice of a finer MgO particulate leads to an increased rate of reaction of MgO with a salt, in the presence of water, in a curing process to form a cement. This is due in part to the increased surface area of the MgO. The increased reaction rate consumes more water during the curing process (e.g., see chemical reaction formula above), leaving less water in the cement. The increased rate of reaction, and consumption of water, is desirable in this continuous process to accelerate the curing while minimizing remaining water after the curing process, discussed in detail below. Likewise, using a MgO-based powder with increased reactivity (e.g., fine-particulate) leads to higher yields of cement in the curing reaction, which produces a stronger product 100. While MgO-based powders of lesser reactivity can be used (i.e., MgO with reduced reactivity (i.e., larger particulate)), the cement formed will be weaker, and excess water will be present after the accelerated curing process (step 1200). The remaining, excess water hinders later steps in the continuous process, and also can lead to a finished product with lesser desirable properties. Further, the increased rate of reaction facilitates higher yields of cement in a product 100. In such aspects, reaction yields between MgO and a salt in the presence of water may range from about 50% up to about 95%. In certain aspects, a yield of at least about 80% is preferred. As non-limiting examples, particles of less than 50 microns, less than 75 microns, and less than 150 microns can be used for MgO-based powders.

In addition, a fine powder not containing MgO can be utilized in the feedstock to reduce porosity of a final product, and increase its water resistance. As discussed below, the continuous curing process can benefit from an increased fiber content. However, increased fibers can lead to more swelling and shrinking of fibers, creating more space/pores between the fibers. A fine powder may be prepared with materials that do not react with water including, but not limited to, natural fibers (e.g. wood, bamboo, and the like), additives ($CaCO_3$, talc, perlite, fly ash, plastic, and the like), and other such materials to reduce porosity by filling spaces (i.e. fillers) between the various sized fibers. The use of an additional powder to reduce porosity with an example board using large fibers can be seen in FIGS. 6A (no powder) and 6B (powder). With a reduction in porosity, the final product 100 comprises fewer open pores for water to enter the product 100.

Water can be added in a variety of amounts depending on process requirements (step 1130). The presence of water in the feedstock will allow for the cement-forming reaction between MgO and a salt to occur. As a non-limiting example, water can be added until a desired level of reactivity can be reached. This can be measured by the amount of remaining, unreacted MgO in a product 100 using x-ray diffraction analysis, as described herein. In some examples, water can be added until only 5% of MgO in a feedstock is unreacted in a product 100. At later steps in the process 1000, substantially most of the water must be removed to facilitate additional process steps (e.g. application of one or more outer layers 1400), as described below.

The amount of water prepared is based upon the amount of water that will be absorbed by the other components of the feedstock, which is highly dictated by the fiber component, discussed below. Water absorption is necessary to ensure proper cement hydration and crystal growth. In such aspects, no excess water will remain in the feedstock following absorption by fibrous components. Feedstocks described herein will not be suspended in water or have any noticeable excess water, as would be expected in a slurry used in traditional wet batch processes. Instead, feedstocks of the present disclosure appear to be more akin to a dry powder with distinct, powder-like fibers that can be spread onto surfaces. Though feedstocks may have a slight, detectable moisture when touched, it is not visibly apparent as to comprise a slurry.

In addition, the amount of water used in the feedstock may affect chemical and physical processes during the various steps after preparing the feedstock. Water is essential for the cement-forming reaction between MgO and a salt during curing (step 1200), with the water removed during curing (i.e., through the chemical reaction, evaporation, or pressure) or after curing (e.g., evaporating or under pressure during drying) (step 1300)) in order to allow subsequent processing (e.g., application of one or more outer layers 1400). However, as discussed above, the amount of water added to the feedstock prior to the curing step occurring is done to ensure that all or substantially all of the added water is absorbed by other components of the feedstock (i.e. no excess water), as discussed below. In such aspects, water is added to the feedstock in the amount that leads to the other components absorbing the water without any water remaining (i.e., the feedstock does not form a slurry). The water level allows for the cement reaction during curing 1200 to occur sufficiently to bind the fibers present in the feedstock without creating a slurry. In such an aspect, the feedstock can be described as dry, as opposed to wet. In certain aspects, the amount of water required can be determined by how much water is necessary to cause a certain amount of MgO in a feedstock to react. In such a certain aspect, levels of unreacted MgO in a product 100 are determined through an x-ray diffraction (XRD) analysis, as known in the art. If unreacted MgO remains in a product 100, additional water can be added to the feedstock recipe. A dry feedstock aids in further processing. As a non-limiting example, a dry feedstock prevents gas bubble formation during processes involving elevated temperatures (e.g., hot pressing) where a wet feedstock (i.e. slurry) might lead to gas bubble formation as the excess water vaporizes. Additionally, elevated water content in a final product 100, caused by the presence of excess water in a feedstock, can decrease rigidity. Decreased rigidity can lead to the failure of the product 100 in its application (e.g. flooring, decoration, and other such applications). Example moisture contents to be desired after different stages of the continuous process 1000 are discussed below.

As discussed above, the water is absorbed by various components of the feedstock. In such an aspect, water may be added to the feedstock ranging from about 20% by weight up to about 50% by weight. Water may be absorbed by fibers. In such an aspect, fibers are chosen to retain a sufficient amount of water to facilitate an effective curing reaction during the curing process 1200 as well as to sufficiently release water content at later stages (e.g., drying 1300), wherein elevated water contents lead to undesired properties (e.g., during drying 1300). High or even moderate water content/retention is not desired for some outer layer application procedures 1400. In such aspects, it is desirable for the MgO product 100 to be configured to have a low moisture content value prior to receiving a top layer. A low moisture content allows water to exit the outer layer during an application process (e.g., hot-pressing, etc.) and absorb into the MgO product, facilitating a stronger bond between a core of the MgO and the outer layer (e.g., laminate, wood veneer, etc.).

Adding fibrous components to the feedstock during its preparation is also included (step 1140). In an aspect, the choice of fibers in the feedstock is important in achieving desired properties of a final MgO product 100, as discussed above. Fibers may be selected from a variety of natural and synthetic fibers. Also important is selection of fiber length and thickness. As a non-limiting example, long and thin fibers increase rigidity and lower water absorbance of a final product 100 while also providing some flexibility. Long and thin fibers may provide increased rigidity, including but not limited to tensile strength, due to including an increased proportion of individual strands. Such strands may more easily entangle with each other. Such entanglement creates a net-like formation inside of a cement matrix formed during curing processes 1200. This combination provides increased tensile strength. Long and thin fibers can additionally be encapsulated better by cement formed during curing processes 1200, as described herein. This may provide a final product 100 that is more resistant to swelling and cracking. Fully encapsulating fibers with cement prevents those fibers from being exposed to further water absorption in a product 100.

In an additional example aspect, short and thin fibers also lower water absorbance of a final product 100. Short and thin fibers are easily compacted. This allows for reduced porosity and increased water resistance. Thick fibers of varying lengths create products 100 with high water absorbance. Such fibers may lead to increased porosity due to the larger fiber size, which can be addressed by using fine particulate to fill these spaces, as discussed above.

Fiber selection determines the absorbance profile of a feedstock in addition to determining important characteristics of a final product 100, as described above. In an example aspect, long and thin fibers provide low water absorbance to a feedstock. In an example aspect, short and thin fibers provide high water absorbance to a feedstock. In an example aspect, thick fibers of varying lengths may provide high water absorbance and uniformity during feedstock preparation. The absorbance profile of fibers in the feedstock is important to allow for both efficient curing 1200 and subsequent processing (e.g. application of one or more outer layers 1400). In such an aspect, initial water absorbance by the fibers is required for the cement-forming reaction of MgO and a salt in the presence of water for curing. Initial water absorbance can be provided by short and thin fibers or thick fibers of varying lengths. In an aspect, lower water absorbance of long and thin fibers may be desired for subsequent processing (e.g. application of one or more outer layers 1400), as described herein. In such aspects, a combination of fibers of various morphologies may be selected to provide the feedstock with an optimized array of process parameters. In certain aspects, fibers may additionally be pre-treated in order to alter their absorption characteristics. As a non-limiting example, fibers may be soaked in a hydrogen peroxide solution to reduce water absorbance in a final product 100. Soaking fibers in a hydrogen peroxide solution, or other similar chemical solutions, leads to digestion of cellulosic components of the fibers, ultimately decreasing water absorbance and swelling.

Fiber selection may also impact the flexural strength of a finished product 100. As a non-limiting example, fibers with lower thicknesses, including but not limited to thin fibers, may provide improved flexibility to a product 100. Such fibers may also be more readily encapsulated by cement crystals formed during a curing process 1200 As a non-limiting example, crystal formation may also be dependent on the ratio of components in liquid mixtures, as described herein. In such an example, crystals may be more readily formed with liquid mixtures including a 0.3 to 1 water:MgO ratio or a 0.40 to 1.5 water-salt-solution:MgO ratio, In some examples, crystals may be more readily formed with liquid mixtures including a 0.3 to 1 water:MgO ratio or a 0.45 to 1.43 water-salt-solution:MgO ratio, and any other appropriate ratios in between said ranges. Cement crystals may form dendritic cement crystals. Such fibers may additionally fill in gaps in a cement matrix. A cement matrix is formed during the curing process 1200, as described herein. Such matrix includes but is not limited to pores or gaps, cement crystals, and other associated components.

As a non-limiting example, a feedstock may only use long and thin fibers. Long and thin fibers may include soft woods including but not limited to pine, poplar, and the like. Such a composition may provide a final product 100 with enhanced flexibility and strength. Such a combination of properties (i.e. flexibility and strength) may be advantageous for products 100 to be used in "click" or "locking" profile applications. Such applications include but are not limited to products 100 to be used in flooring installation where separate panels click and lock into place. In an additional, non-limiting example, a feedstock may use a majority of long and thin fibers while the remaining fibers will include different morphologies. In some examples, only thick and short fibers or thick and long fibers or a majority of such fibers may be used instead. Such fibers may be sourced from hardwoods including but not limited to oak. In such examples, products 100 may be used in applications not requiring flexibility.

In an additional aspect, fibers not bound by lignin may also be used. As a non-limiting example, fibers bound by lignin may include fiber-containing structures. Such structures may have been less processed than fibers not bound by lignin. One such example may include a block of unprocessed wood. In such an example, the wood might contain fibers that are bound by an increased amount of lignin relative to processed fibers that are unbound by lignin. Incorporating fiber with less lignin produces products 100 with better properties including but not limited to tensile strengths. Fibers not bound by lignin may have higher volumes of actual fiber (i.e. not lignin). This allows for such fibers to provide more fiber per area when added to a product 100. Increased fiber per area may provide enhanced flexibility to a final product 100. As a non-limiting example, fiber per area values of about 1 up to abo0ut 10 g/in$^2$, about 2 up to about 9 g/in$^2$, about 3 up to about 8 g/in$^2$, about 4 up to about 7 g/in$^2$, and about 5 up to about 6 g/in$^2$ may be used. In one example, the fiber per area may range from 2 up to 5 g/in2.

The fibrous components can include, but are not limited to, wood fibers, bamboo fibers, cellulosic fibers, other natural fibers (e.g., hemp fibers, pecan fibers), synthetic fibers (e.g, acrylic, polypropylene (PP), polyethylene terephthalate (PET)), and the like. Some fibers may be desired to be avoided. Fibers high in lignin, hemicellulose, sugars, fatty acids, or other organic impurities may hinder cement set time and crystal growth. As discussed above, the fibrous components, added before curing, assist with retaining moisture during curing. In an aspect, a continuous curing process requires more fiber content than in traditional curing settings, so more fiber is needed in the prepared feedstock. The continuous curing process is accelerated with elevated temperatures and pressures. The continuous curing process also uses a feedstock with no excess water content, as described above. Such a combination leads to a decrease in the cement formation. By adding more fibers to the feedstock, the increased fiber content is effectively bound together regardless of decreased levels of cement formation. The increased fiber content provides an effective binder to form an MgO core with the necessary characteristics, in spite of the decreased amount of cement formation. Increasing the fiber content allows for the creation of an MgO core with rigidity, strength, and other such desired properties that would not be expected with lower levels of cement formation due to a lesser amount of excess water and time for traditional curing. In an aspect, fiber selection for the feedstock can also affect surface smoothness of a MgO product. Long fibers may lead to decreased smoothness, whereas short fibers may lead to increased smoothness. In some aspects, surface smoothness may be desired for further processing including but not limited to addition of a top layer. In some examples, short or shorter fibers may be used closer to the surface of the MgO core to obtain smoother surfaces, while a mix of short or long fibers may be used towards the middle and away from the surfaces or vice-versa. In some examples, a mix of short and long fibers may be used throughout the MgO core with more short fibers being present at and near the surfaces, and more long fibers being present towards the middle, or vice-versa.

Fibers may also be rinsed in some examples. Rinsing fibers may clean them or alter their structure. This may promote bonding of fibers to cement. Fibers may be rinsed with hot or cold liquids. Such liquids may include but are not limited to water, alkaline solutions, sodium hypochlorite solutions, sodium hydroxide solutions, and other such known fiber cleansers.

The composition of the feedstock may also include additives and other such substances known in the art (step 1150). Additives assist in providing additional desired characteristics to an MgO core. As non-limiting examples, additives may disperse particles in the core uniformly, improve the water resistance of the board by encapsulating un-reacted MgO particulate, help molecules (e.g. water, salt, minerals, etc.) to move more freely during a curing phase and reduce the risk of cracking, fill voids in the core and reduce porosity, improve bonds between fibers, and the like. Additives may include, but are not limited to, latex, phosphoric acid, perlite, $CaCO_3$, talc, synthetic fibers, polymers, and other such substances.

The dimensional stability of the MgO product 100 can be measured in various ways. As a non-limiting example, measuring linear growth of a product 100 after submersion in water at ambient conditions for about 24 hours per Window and Door Manufacturers Association Test Method (WDMA T.M.) 2-15 testing standards may be referred to as a swello-meter test. In such a test, it may be desirable to achieve an initial swell of less than about 0.80% up to about 0.60%, which indicates that enough water is present. In an additional aspect, it may be desirable to achieve an initial swell of less than about 0.50%. In such an aspect, levels of initial swelling provide enough water to enable at least 95% of MgO in a feedstock to react in a curing reaction (i.e. 5% unreacted MgO). In such an aspect, fibers may be selected to achieve this initial swell. Fibers of different characteristics (e.g., length, thickness, material, etc.) absorb water differently, as described herein. As a non-limiting example, fibers absorbing about 60% to about 400% of their own weight in water may be used. Such absorption may allow the fiber to effectively bind to cement formed during curing, as described herein. Under-absorption (e.g., <60%) may cause a porous cement matrix formed during curing with exposed fibers. Over-absorption (e.g., >400%) may cause an over swollen fiber that is difficult to encapsulate in a final product 100. Lack of encapsulation may lead to the fiber absorbing more water over time. This could crack or swell the product 100.

In an aspect, while the length and thickness of the fibers utilized can be an important factor, the surface area of the fiber (sometimes referred to as particle size) plays an important factor. As a non-limiting example, fibers having surface areas of less than about 0.4 mm may be used. In an additional, example aspect, fibers with surface area less than about 0.2 mm may be used.

In additional aspects, it is desirable to use fibers having a range of surface area sizes, as both large (e.g., larger in length increase strength) and small (e.g., short and thin take up space/fill voids) are needed for certain characteristics of the MgO product to be met. In additional aspects, combinations of fiber surface area may be used in a single batch. As a non-limiting example, a blend of fibers including no more than about 70 weight % of fibers with surface area of about 1 mm, about 20 weight % to about 70 weight % of fibers with surface area of about 0.45 mm up to about 0.7 mm, and about 4 weight % up to about 15 weight % of fibers with surface area less than 0.1 mm may be used. In most instances, fibers with over 4 mm in surface area should not be included.

Just as with surface area values, the length and thickness of the fibers can vary, including in single batches. As non-limiting examples, fibers of about 0.1 mm up to about 4 mm in length may be used. In some examples, thicknesses of about 0.02 mm up to about 0.05 mm in length may be used. In an example aspect, fibers encompassing the desired properties according to the present disclosure include, but are not limited to, wood fiber, hemp fiber, rice fiber, cellulose fiber, pecan fiber, synthetic fibers, and other such fibers known in the art.

After preparing the feedstock (step 1100), the curing process (1200) can begin. In an aspect, the curing process 1200 begins when components of the feedstock are introduced to one another. More specifically, the curing process starts when MgO and a salt come into contact in the presence of water (step 1210). In such an aspect, MgO and a salt in the presence of water can undergo a curing reaction to form a cement. In an aspect, in order to have a good distribution of all material, the water and salt may be mixed together first. The water and salt solution may then be added to the fibers. If additives are to be used, they may be added to the fibers before the introduction of the water and salt solution. In some examples, additives may also be added at other steps of feedstock preparation. The fibers having absorbed the water and salt solution may then be mixed with an MgO-based powder. After incorporation and mixing of the MgO-based powder, the feedstock can be kept at a desired temperature and humidity condition (e.g. 60° C. and 70% relative humidity) for about 30 min. This can assist the chemical reaction to start and achieve desired cement formation. During this phase, some of the water will begin to be consumed by the cement forming reaction with MgO and a salt. This consumption will make the feedstock drier and reduce the risk of air pockets during the curing phase.

As a non-limiting example, it may be advantageous to first mix all dry materials before combining dry materials with liquids. This allows for reduced water content in final feedstocks, as you can continue to add dry materials to liquids until the water content is visibly reduced. It may be advantageous to add the mixed dry materials to the liquids, instead of the liquids to the mixed dry materials. Liquids may include solutions of water and salts, as described herein.

Figure 9:
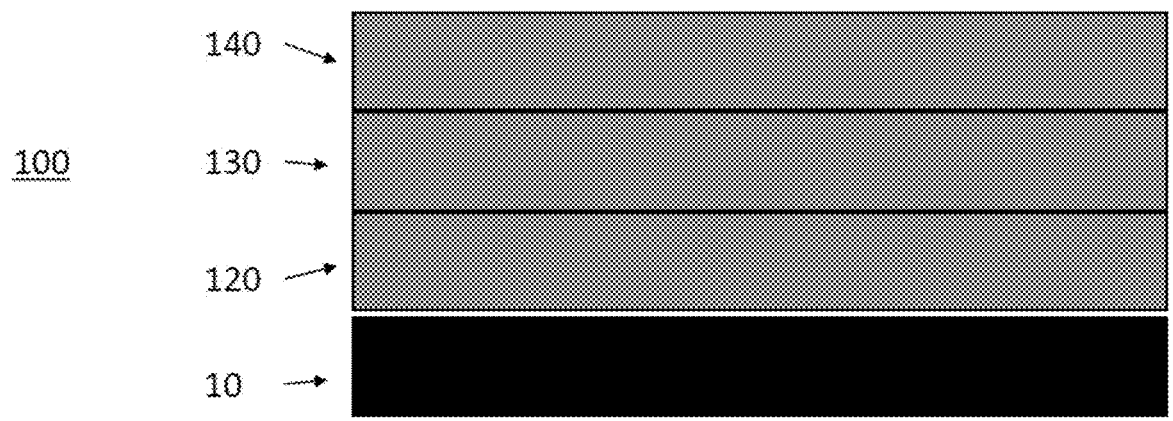
FIG. 9 displays a schematic representation of an example product according to an aspect of the present disclosure.

Once mixed, the feedstock can be spread on a surface 10 (e.g., conveyor belt, as shown in FIG. 9) (1220). The surface 10 may include molds to form MgO products or be flat. In an aspect, the feedstock as spread is relatively dry when spread out based upon the absorption of water by the components, as well as the progress of the curing reaction. Once spread on the surface, the curing process is accelerated using a combination of elevated temperatures and pressures (step 1230). In such an aspect, elevated temperatures may comprise temperatures ranging from about 160° F. up to about 300° F., compared to the prior art ranges of about 75° F. up to about 150° F. In some examples, the elevated temperatures may range from 155° F. to 310° F. In certain examples, the elevated temperatures may range from about 180° F. up to about 210° F. Further, elevated pressures may comprise pressures ranging from about 4 MPa up to about 10 MPa per square inch. In some examples, the elevated pressures may range from about 2 MPa up to about 13 Mpa or from about 2 MPa up to about 4 MPa. Regardless of the known ranges, MgO products have not previously been cured utilizing both elevated temperature and pressure levels. Traditional approaches have focused on no to little added pressure (i.e., processes using high water content versus low water content feedstocks), as well as low temperatures (i.e., both wet and dry MgO board productions). In an aspect, elevated temperatures and pressures may accelerate the chemical reaction and remove water from the feedstock quicker, while still retaining enough water to further advance curing. In an aspect, the fibers described herein allow the feedstock to maintain sufficient levels of water to achieve required reaction yields (i.e., MgO and a salt react in the presence of water to form a cement) while minimizing any remaining amounts of unnecessary water after the curing has occurred.

As discussed above, using a fine MgO particulate may result in increased reaction rates and yields due to increased surface area. In such an aspect, increased reaction rates assist in reducing the amount of time required for curing. Reduced curing time allows for the curing process to be continuous. In such an aspect, reaction yields may range from about 50% up to about 80%. In such an aspect, simultaneously elevating temperature and pressure allows the curing process 1200 to occur more rapidly than prior art curing processes for MgO products. Elevated temperatures increase the speed of reaction due to effects such as, but not limited to, endothermic reactions, LeChatelier's principle, and the like. Temperatures cannot be overly elevated, however, as this may result in amorphous cement formation. Amorphous formation is undesired and may weaken the board. Therefore, while it is possible to expose the curing feedstock to temperatures over 310° F., it is not advisable to do so in order to avoid amorphous cement formation. In some aspects, exposing the curing feedstock to temperatures above 300° F. may cause amorphous cement formation.

Elevated pressures are desired to increase heat transfer from the elevated temperature in the environment to the middle of the product. This will allow for more efficient reactions, as the whole board will receive elevated temperatures more quickly. In such an aspect, the curing process 1200, occurring at elevated temperatures and pressures, may occur within about 3 minutes up to about 10 minutes, compared to the 6 hours to 72 hours curing time for batch processes known in the art. Additional curing times and considerations thereof are described herein. In such aspects, the feedstock in the continuous process described herein can be de-molded (i.e. removed from its mold) after the about 3 minutes up to about 10 minutes. This greatly differs from traditional batch processes where the MgO material must remain in the mold for an extended period of time. Depending on the combination of the temperature, pressure, as well as moisture content in the product, the curing processing time can vary. In one aspect, the curing time can be under sixty minutes at a lower elevated temperature (e.g., around 155° F.). In another aspect, at 180° F., the curing time may be 30 min, while at 250° F., the curing time can be 3 min depending on how much water is in the mixture. As non-limiting examples, curing may occur at about 4 MPa and about 200° F. for about 10 minutes. As a further non-limiting example, curing may occur at about 6 MPa and about 270° F. for about 5 minutes. In an additional aspect, use of low moisture content feedstocks, as described herein, also allow the product emerging from the curing process 1200 to have a low moisture content. This allows a subsequent drying process to occur more rapidly. Also, while the majority of the curing occurs during the curing process in which elevated temperatures and pressures are applied, curing on a smaller scale can occur after this exposure (e.g., during drying 1300), which can also lead to the reduction of water content in the final product, while also strengthening it as well. However, if there is too much water, then it can cause bubbles (it may boil) and create boil ripples in the board which is not desirable.

As discussed above, the feedstock, after mixing, may be laid onto a surface and exposed to elevated temperatures and pressures during the curing portion (step 1200) of the continuous process according to an aspect of the present invention. The surface may comprise a moving belt. In such an aspect, the moving belt may move the feedstock through a machine that provides the elevated temperatures and pressures required to accelerate the curing process (step 1230). The machine may be selected from a variety of machines capable of providing elevated temperatures and pressures to a continuous flow of feedstock, including, but not limited to, a continuous, double-belt press. Other machines that can apply pressure and heat could be used.

As the feedstock moves through the machine (see FIG. 7), the moisture content of the reacting feedstock is lowered during the curing process 1200. Moisture content may be lowered during the curing process (step 1200), especially during application of elevated temperatures and pressures (step 1230), with much of the water consumed due to curing, while an additional portion of the moisture/water may also evaporate due to elevated temperatures and pressures of the machine. In such an aspect, the moisture content may be lowered to a desired level for subsequent processes (e.g. drying 1300, application of one or more outer layers 1400). In such an aspect, the MgO product may comprise a moisture content of about 4% up to about 20% after emerging from the application of elevated temperatures and pressure 1230 during the curing process 1200 dependent on the time, temperature, and pressure applied. In such an aspect, the MgO product may comprise a moisture content of about 5% up to about 12%. In some examples, the MgO product may comprise a moisture content of about 2% up to about 20% after emerging from the application of elevated temperatures and pressure 1230 during the curing process 1200 dependent on the time, temperature, and pressure applied. In some aspects, the MgO product resulting from the process described herein may comprise a moisture content of about 2% up to about 6%.

Traditional slurry (i.e. wet) batch processes (i.e., when the feedstock is placed on surfaces of molds without exposure to higher temperatures and pressures) include higher moisture contents after emerging from curing. For example, traditional slurry batch processes that have excess water levels in the feedstock may have products with 10% up to 25% moisture content after curing. Traditional dry batch processes using feedstocks with no excess moisture may have products with moisture contents after curing of 7% up to 20%. In such an aspect, traditional batch processes remove products from molds with these moisture levels and then sends the product to subsequent processing steps, such as drying, at the conclusion of curing (that is, when the products reach the range of moisture content.) These traditional slurry batch processes may require 6 hours up to 24 hours of curing to achieve this moisture content for high moisture feedstock processes and 12 hours up to 72 hours for low moisture feedstock processes. The curing process 1200 according to an aspect of the present disclosure can achieve a desired moisture content of about 5% up to about 12% in less than about 1 hour as elevated temperatures and pressures are applied to the feedstock during curing (step 1230). In additional examples, desired moisture contents can be achieved in curing times occurring in about 10 minutes up to about 60 minutes, about 3 minutes up to about 60 minutes, about 10 minutes up to about 50 minutes, and in about 3 minutes up to about 10 minutes. Curing times may depend on temperatures used during curing and the amount of water present in the feedstock composition. As a non-limiting example, curing occurring at 180° F. may occur over about 30 min. In an additional non-limiting example, curing occurring at 250° F. may occur over about 3 min. In both such examples, required curing time may depend on how much water is present in the feedstock composition. In such examples, high water compositions may cause bubbles to form during curing due to water evaporating that could cause ripples or other defects in final products 100.

In some aspects, a curing process accelerated using elevated temperatures 1200 may result in unreacted salt in the hardened MgO product 100. Additional factors may also lead to unreacted salt, such as inefficient mixing which may not uniformly distribute reactants throughout a feedstock. The salt may attract moisture in a final product 100, leading to lowered rigidity. In additional aspects, an accelerated curing process 1200 may result in a higher percentage of amorphous phase reaction products. A slower curing process, as used in traditional batch processes, may result in a lower percentage of amorphous phase reaction products with a higher percentage of crystal phase reaction products. In such aspects, higher levels of crystalline products and lower levels of amorphous products lead to a product with increased rigidity. As a result, accelerated processes may incur lower rigidity. To combat the lowered rigidity due to the moisture-capturing salt and lower crystalline reaction product, the final product 100 may be made to have a larger thickness 110 to accommodate for decreased rigidity. In such aspects, the thickness 110 of a product 100 cured in an accelerated curing process may be made to be about 5% thicker up to about 15% thicker than a product 100 made with an un-accelerated curing process in order to address potentially decreased rigidity.

As an example, utilizing bend tests according to ASTM 1037, products having thicknesses of about 6 mm and about 7 mm made by via prior art batch processes yield static bend test results of about 75 lbf and about 100 lbf, respectively. In some examples, similar sized products 100 of about 6 mm and about 8 mm made by the continuous process 1000 of the present disclosure yield static bend test results of about 55 lbf and about 85 lbf, respectively. By increasing the thickness of the products 100 of the continuous process by 10-15%, equal static bend test results compared to the prior art batch processes are produced. For example, a 7 mm product 100 produced by a continuous process yields an 85 lbf static bend test result, and a 9 mm product 100 produced by a continuous process yields a 110 lbf static bend test result. In addition, adding 2-5% more weight of fibers, to the overall mix, would also achieve the same result. While more material may be utilized to make the product, the increased associated cost is offset by the large reduction in processing time during curing 1200.

As an additional example, the present disclosure relates to various compositions of feedstock to produce products 100. Other examples of compositions may lead to products 100 having higher or weaker tensile strength than the example discussed above. As an example, the present disclosure relates to boards having a thickness of about 5 mm and capable of withstanding an 80 lbf static bend test. In such an example, increasing the product's 100 thickness still increases tensile strength. In such an example, a product 100 using the same composition may withstand 110 lbf in a static bend test when produced at a thickness of about 6 mm. A board of about 7 mm may be capable of withstanding 120 lbf in a static bend test. A static bend test result of about 80 lbf may be advantageous for example applications. As an example, an application applying paper layers to the top and bottom of a product 100 may require an 80 lbf minimum static bend test result for the paper layers to be balanced (i.e., to counter the dimensional instability or desire of paper to shrink and thereby cause the board to curl).

In other examples, increased thicknesses may not be required to maintain end product 100 qualities compared to prior art products. In such examples, fiber compositions and concentrations, not end product thicknesses 100, can be altered to provide the same or improved qualities as a prior art product. In such examples, qualities include tensile strength, flexibility, and the like. In such examples, qualities of an end product 100 can be maintained compared to a prior art product of the same thickness by using about 20% weight up to about 40% weight of long and thin fibers in a feedstock, as described herein. Such fibers may include lengths of up to about 4 mm. Such fibers may additionally be micro-fibrillated. In such examples, board thickness may still be increased. This will increase the end product 100 strength compared to prior art products using batch curing processes.

As discussed above, a traditional curing time of about 6 up to about 24 hours can be reduced to about 3 minutes up to about 10 minutes or other such curing times discussed herein. The use of a continuous curing process 1200 also negates the need for storage rooms required for traditional methods store feedstock in molds for the duration of the curing process.

After curing 1200, the product 100 can be removed from molds (step 1240) and cut into desired sizes (step 1250) before transferring to a drying process 1300, as shown in FIG. 7. In other aspects, the product 100 can be cut within the molds before being removed. In an aspect, the moisture content of the product may first be maintained after exiting the curing process 1200 and prior to drying 1300. In such an aspect, a product may be placed onto a pallet or some other storage mechanism and allowed to sit prior to drying for an allotted period of time. Maintaining the moisture content after the accelerated curing process 1200 allows the product 100 to achieve desired strength by allowing additional curing to continue. In such an aspect, moisture content may be maintained for several hours or for a few days. This additional curing is done in the absence of elevated pressure and temperatures.

However, in some aspects of the present invention, the additional time between curing and drying processes is not necessary for the continuous process. For example, the product 100, after curing, can be moved onto drying apparatuses (e.g., drying racks) (step 1310) immediately after leaving the curing process. In such an aspect, the moisture content can then be reduced during the drying process to a desired level. A drying process may include placing a product in an oven. A drying process may include placing a product on a conveyor (e.g. belt or racks) and moving it through a tunnel. Temperature and humidity within a tunnel can be raised or lowered to achieve the desired moisture content of the product 100 as it emerges. In such an aspect, drying may occur by applying elevated temperatures for a length of time (step 1320). The elevated temperatures can range from about 140° F. up to about 390° F. Though the use of high elevated temperatures (e.g. over 300° F.) during curing may lead to amorphous cement formation and should therefore be avoided, high elevated temperatures are acceptable during drying. The majority of the cement formation has occurred during the curing process, leading to a decreased likelihood of amorphous cement formation during drying. In such an aspect, drying may occur from about 30 min up to about 4 h. As non-limiting examples, drying can occur for about 30 minutes at about 320° F., about 4 h at about 150° F., and any combination thereof. The drying can occur until a desired moisture content level is reached (step 1330). In such an aspect, the moisture content can be reduced to about 4% up to about 13% depending on the desired application for the board 100. In some instances, the moisture content reduction can be targeted to produce an MgO core with a moisture content between about 6% up to about 8%.

Figure 5:
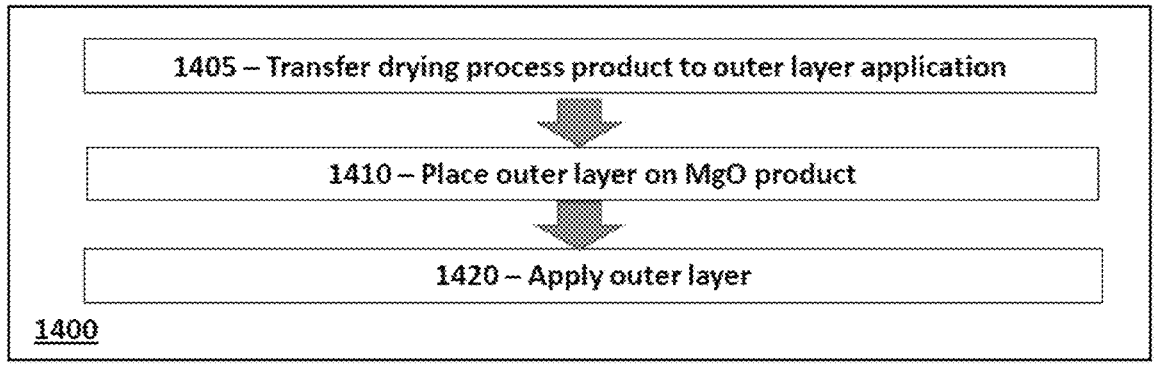
FIG. 5 illustrates an example of an outer layer application process according to one or more example aspects of the present disclosure.

After completion of the drying process (step 1300), the MgO product can go through an application of one or more outer layers 1400, as shown in FIGS. 1, 5, and 7. In such aspects, the product from the drying process 1300 can be transferred to an outer layer application process (step 1405). The MgO product is fed to the application process where an outer layer can be placed onto a surface of the MgO product (e.g., MgO core formed in the previous steps) in step 1410 to be applied in step 1420. These outer layers can include, but are not limited to, laminates, wood veneer, melamine, phenolic resin papers, melamine-impregnated phenolic resin paper, vinyl, digital printed ink, urethane coatings, stain coatings, and other such materials depending on the application. In such aspects, melamine may be chosen due to its scratch resistance.

Figure 8:
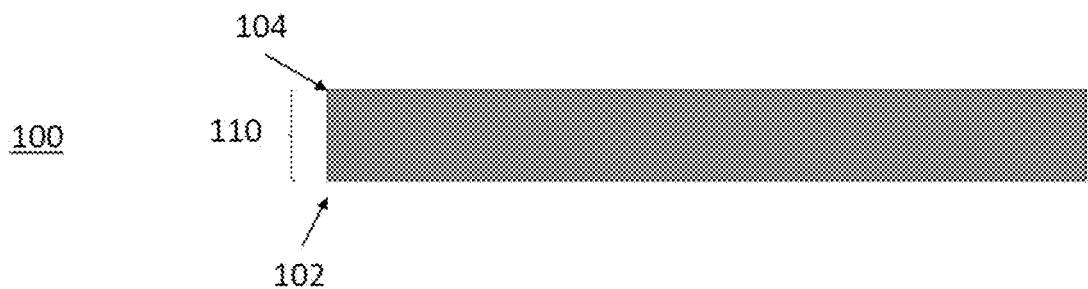
FIG. 8 displays a schematic representation of an example product according to an aspect of the present disclosure.

In an aspect, the outer layer can include a decorative MgO surface-covering for placement on the MgO core/product 100. In an example aspect, an MgO core/product 100 comprises a first surface 102, a second surface 104, and a thickness 110, as shown in FIG. 8. The MgO core can be configured to bond to additional layers (also interchangeably referred to as 'outer layers' or 'top layer(s)' throughout this disclosure without departing from a broader scope of the disclosure). The additional layers added to the MgO core can be one or more outer layers that may include, a single layer or multiple layers of materials described herein (e.g., laminate, wood veneer, etc.). The multiple layers may include, but are not limited to, a décor layer and a wear layer. In some examples, the décor and wear layer may be a single layer in which case the top layer may be a single layer. For example, décor paper impregnated with melamine. In some examples, a single ply of décor paper impregnated with melamine. In other examples, a primer coating may be applied to the surface of the MgO core and image may be digitally printed thereon. The image may include UV inks or other similar types of inks. While it is possible additional layers can be added to both sides of the MgO core, in some instances the additional layers will be added to only one side of the MgO core. In some aspects, the outer layer can be applied to a first surface 102 of a product 100, a second surface 104 of the product 100, or both. An outer layer can be applied (step 1420) through various processes including but not limited to hot pressing, cold pressing, double belt pressing, single daylight pressing, and the like.

The fibers added to the feedstock may also be used to facilitate application of one or more outer layers to the product 100. In such aspects, short and thin fibers may initially retain water, while long and thin fibers that retain less water facilitate ease of application of one or more outer layers 1400. In such an aspect, the fibers, having been present during a curing process 1200 with elevated temperatures and pressures and subsequent drying, facilitate application 1400 by absorbing liquid that exits an outer layer as it is bonded to the product. In such an aspect, the absorption of liquid into fibers allows for the outer layer(s) to better adhere to the MgO-based product 100 during the application process 1400. In such an aspect, application 1400 may occur using a variety of processes. Such processes may occur within about 30 seconds up to about 4 hours at about 260° F. up to about 360° F. and about 1 MPa up to about 4 MPa, dependent on the chosen application process 1400.

As discussed above, the continuous process according to aspects of the present disclosure can lead to a significant reduction of production time for an MgO product. Traditional wet batch processes can take 6 hours up to 24 hours to cure and 6 hours up to 24 hours to dry with an intermediate stage between curing and drying that can take from 12 hours up to several days. As a result, traditional wet batch processes may take from 36 hours up to 120 hours to produce an MgO product 100. Traditional dry batch processes can take 12 hours to 72 hours to cure and 1 hour to 12 hours to dry with an intermediate stage between curing and drying that can take several days. As a result, traditional dry batch processes can take from 85 hours up to 156 hours. The continuous process described herein can take about 3 minutes up to about 10 minutes to cure, or other curing times as discussed herein, and about 3 minutes up to about 24 hours to dry. In additional examples, drying may take about 1 hour up to about 12 hours. As a result, the continuous process can take about 1 hour and 3 minutes up to about 24 hours and 10 minutes to create an MgO product 100, or from about 1 hour to about 25 hours. In certain aspects, drying may take about 6 hours to occur.

IV. Compositions and Example Processes

The compositions and example processes below are to be understood as potential compositions and processes related to the present disclosure. Such compositions and example processes are not intended to be limiting of the scope of the present disclosure.

Table 1 below provides potential compositions to be used in preparing a feedstock. Example 1 provides a strong board with a low moisture content after curing, which allows a very quick drying process. Example 1 may possess unreacted MgO after curing, which may result in swelling of a final product 100 in humid environments. Example 2 includes more water than Example 1, which aids in reducing unreacted MgO levels. This can assist in decreasing unwanted swelling of a final product 100. However, the ratio of water to MgO is greater than 1, which will make the make more magnesium hydroxide (which provides no strength value) than the crystal that we need. Also, the ratio of water to MgO above 1 will cause bubbles and may cause issues with a continuous press process. Example 3 displays a feedstock with too low of a fiber content. This low fiber content may lead to a weak board. Additionally, as described herein, feedstocks of the present disclosure should be dry once prepared. Using a low fiber content may lead to less water absorption, which is necessary to make a dry powder-like feedstock. Example 4 shows a feedstock composition with too much $MgCl_2$. The increased level of salt will attract room humidity and causing condensation to collect on the surface of the product 100. This effect is referred to as "sweating."

TABLE 1

Example Feedstock Compositions

| Component | Example 1 Weight % | Example 2 Weight % | Example 3 Weight % | Example 4 Weight % |
| --- | --- | --- | --- | --- |
| MgO | 45 | 30 | 42 | 30 |
| MgCl2 | 4 | 4 | 4 | 10 |
| Water | 11 | 35 | 42 | 30 |
| Wood fibers | 35 | 31 | 12 | 30 |
| Perlite | 5 | — | — | — |

In an aspect, the composition of a feedstock may be chosen to achieve a desired final product 100. In such an aspect, a feedstock may be prepared with a MgO powder. The MgO based powder can make up about 30% up to about 50% by weight of the feedstock. Fibers may comprise about 20% up to about 50% by weight of the feedstock. Water may comprise about 20% up to about 50% by weight of the feedstock. As previously discussed, all water in a feedstock will be absorbed by fibrous components such that the feedstock is not suspended in water like a slurry. Instead, the feedstock is akin to a dry feedstock powder that with individual fibrous components that can be spread onto a surface. In certain aspects, salt comprises about 3% by weight up to about 6% by weight of the feedstock. In such an aspect, the feedstock may further comprise additives. The additives may comprise about 0% up to about 10% by weight of the feedstock.

In an aspect, feedstock components may be mixed in certain orders. In order to facilitate proper distribution of materials required for MgO core formation, water and salt may first be mixed, with the fibrous components added next to absorb the water and salt solution. An MgO-based powder may then be added. Once prepared, a feedstock may be allowed to rest for about 20-40 minutes (e.g., 30 minutes) in warm (e.g. about 130° C. up to about 160° C., such as about 140° C.) and humid conditions (e.g. about 63% up to about 80% humidity, such as about 70% humidity). Such resting allows for cement formation to begin occurring prior to spreading the feedstock. Resting may also allow for reduction of air pockets as water and MgO begin to react. Following a rest period, any necessary additives may then be added. This order of feedstock preparation is example and non-limiting.

As discussed above, the accelerated curing process can result in excess salts remaining in the final product. For example, $MgCl_2$ may be used as a salt. When this salt is dissolved in water, it splits into Mg+ ions and $Cl_2-$ ions. The $Cl_2-$ can corrode metal. If the amount of salt added to a feedstock is not properly calculated or if the salt does not fully react with the MgO, $Cl_2$ ions may remain in the board. These $Cl_2-$ ion are unstable and will attract $H_2O$ contained in the air. The $H_2O$ from the air will condensate on the surface of the board and form water droplets, wherein high levels of $Cl_2-$ may dissolve into the water droplets. If such droplets come in contact with metal (e.g. electric outlets, metallic structures, electric switches, and the like), the $Cl_2-$ will start to corrode all metals, which may result in failure of such systems. Therefore, free chloride ion concentration in a final product 100 may be tested. In an example aspect, ASTM D512-12 testing methods can be used to test free chloride ion. In such an aspect, products 100 of the present disclosure contain a free chloride ion concentration of less than about 6%, providing minimal risk of corrosion. In an aspect, the density of a final product 100 may range from about 1300 kg/m$^3$ up to about 1700 kg/m$^3$. In certain aspects, the density of a final product 100 may range from about 1400 kg/m$^3$ up to about 1500 kg/m$^3$. Increased densities of products 100 may allow improved strength of products 100 including but not limited to tensile strength and flexural strength. Densities of products 100 may be affected by a number of factors. Such factors may include but are not limited to air voids in a product 100, the amount of filler used in a product 100, and the like. Density may also affect the tensile strength of a product 100. In some examples, a product 100 including less than 1% of end product volume comprised of air voids may be desirable.

In an aspect, process steps of the continuous process 1000 can be arranged to occur in a variety of orders. In such an aspect, example process steps include, but are not limited to, preparing a feedstock (step 1100), curing (step 1200), drying (step 1300), and application of one or more outer layers (step 1400). In an aspect, a feedstock can be prepared as follows and as displayed in FIG. 2. A salt (see above for examples of salts) may first be mixed with water to prepare a solution. The solution of salt and water may be added to a blend of desired fibers. In such an aspect, desired fibers may be selected from a group including, but not limited to, wood fibers, bamboo fibers, cellulosic fibers, hemp fibers, natural fibers, pecan fibers, natural fibers, synthetic fibers, and other such fibers known in the art. In such an aspect, desired fibers may comprise varying lengths and thicknesses. The blend of desired fibers may absorb the solution of salt and water. The blend of desired fibers having absorbed the solution of salt and water may still be sufficiently dry to be spread or scattered. These fibers can then be mixed with MgO, with any desired additives (e.g. latex, phosphoric acid, synthetic fibers, pearlite, etc.) being added after to finalize the feedstock. As discussed above, the preparation of the feedstock can occur in a number of alternative steps. As discussed above, curing can begin after mixing in the components, as the MgO and salt are introduced to one another in the presence of water.

Figure 3:
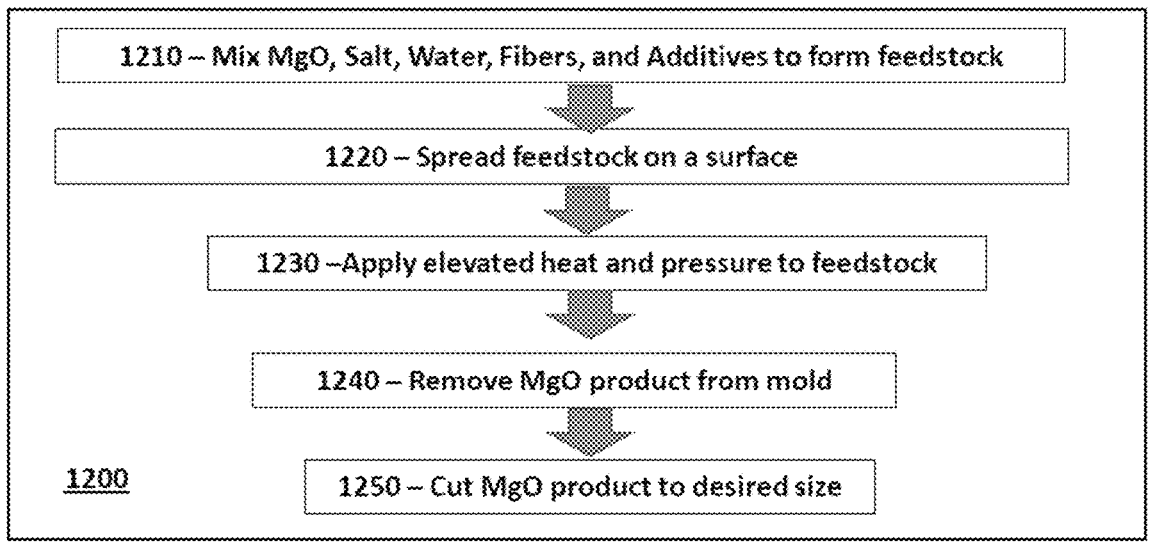
FIG. 3 illustrates an example of a curing process according to one or more example aspects of the present disclosure.
Figure 4:
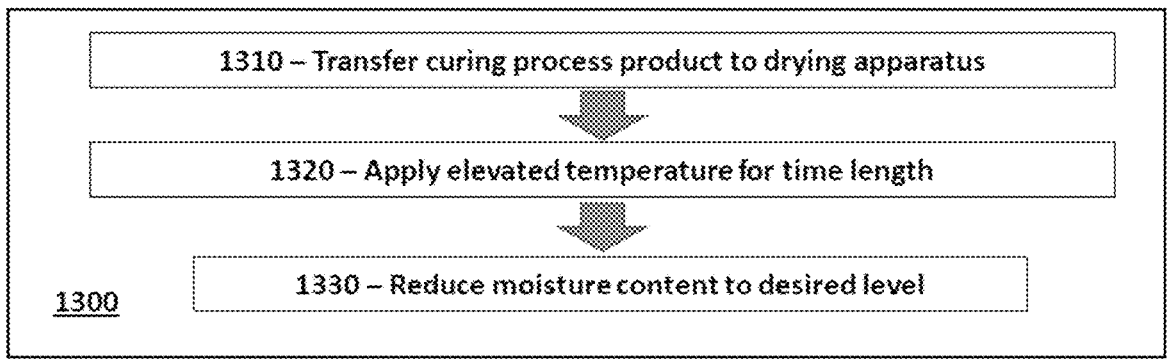
FIG. 4 illustrates an example of a drying process according to one or more example aspects of the present disclosure.

The mixture is then scattered onto a surface of a moving belt to be processed by a machine for the accelerated curing process 1200, as shown in FIG. 3. The curing process 1200 applies elevated temperatures and pressures to the mixture/feedstock for a given amount of time, accelerating the curing. Upon completion of the accelerated curing process, the product 100 emerging from the machine and is then transferred to a drying process 1300, as shown in FIG. 4, to reach a desired moisture content. Once the targeted moisture content is reached, the dried product 100 can then go through an application of one or more outer layers 1400 to have an outer layer added to one or both surfaces (see FIG. 5).

In an aspect, two or more feedstocks comprising different fiber compositions for use in forming a final product may be prepared. For example, a first feedstock comprising short fibers of chosen thicknesses and materials and a second feedstock 20 comprising long fibers of chosen thicknesses and materials may be prepared. The first feedstock can then be layered on the second feedstock to achieve desired product 100 properties. As a non-limiting example, the first feedstock may be layered onto a surface 10 to form a first layer 120, with the second feedstock being layered on the first layer 120 to form a second layer 130, as shown in FIG. 9. Additional layers 140 made of different feedstocks of different compositions, or utilizing the same feedstocks discussed above, may be added to the first and second layers 120, 130. Feedstocks comprising short fibers may allow for ease of outer layer application in a subsequent process step 1400, and can be the outer layer(s) 120/140 of the product. In an aspect, additional layering techniques can be used. In such an aspect, two, three, four, five, or more layers could be used.

In an aspect, curing processes 1200 and outer layer application processes 1400, as described above, may be combined. In such an aspect, outer layer(s) are placed onto surfaces 102 and 104 of a product 100 before the product enters a machine of a curing process 1200. In such an aspect, a first outer layer(s) may be placed onto a surface. A feedstock may then be scattered onto the outer layer. In such an aspect, a second outer layer(s) may then be placed onto the scattered feedstock. In such an aspect, the outer layer(s) may comprise melamine (e.g., melamine based layers such as, but not limited to, melamine impregnated paper). In such an aspect, an outer layer may further comprise a phenolic resin paper. In such an aspect, an outer layer may further comprise additives including, but not limited to, formaldehyde. In an aspect, an outer layer may also be chosen from other materials including, but not limited to, wood veneer, laminates, vinyl, digital printed ink, urethane coatings, stain coatings, and other such materials. In such aspects, a product 100 now comprising one or more outer layer(s) abutting both surfaces 102 and 104 can move along a moving belt into a machine to cure. A product 100 can also be configured to have one or more outer layers abutting only one surface 102 or 104 before moving along a moving belt into a machine to cure. In such an aspect, the product 100 can cure as the outer layers are simultaneously joined to the product 100. In such an aspect, separate curing processes 1200 and outer layer application processes 1400 are no longer required. In such an aspect, production cost and time can be reduced.

As discussed above, MgO based products include some advantages over other building materials. As a non-limiting example, incorporating MgO into or above subflooring (e.g., as a surface covering above concrete subflooring) may prove advantageous to prevent rotting of a floor structure in the event that water permeates through the floor structure. Other materials that could be used in similar fashions, such as High Density Fiberboard (HDF), plywood, and Oriented Strand Board (OSB) do not have such properties and are, therefore, very susceptible to water damage. MgO-based products additionally provide superior fire resistance compared to materials such as plywood and OSB board.

Although several aspects have been disclosed in the foregoing specification, it is understood by those skilled in the art that many modifications and other aspects will come to mind to which this disclosure pertains, having the benefit of the teaching presented in the foregoing description and associated drawings. It is thus understood that the disclosure is not limited to the specific aspects disclosed hereinabove, and that many modifications and other aspects are intended to be included within the scope of any claims that can recite the disclosed subject matter.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, can be executed out of order from that shown or discussed, including substantially concurrently or in reverse order, depending on the functionality involved, as would be understood by those reasonably skilled in the art of the present disclosure. Many variations and modifications can be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

Compositions

The process above can create a variety of MgO-based products. In an aspect, the MgO product has a 80 lbf of tensile strength. In another aspect, the MgO product with a 3.5% thickness swell when submerged in water for 24 hours. In an aspect, the MgO product has less than 1% by volume of entrapped air. In an aspect, the MgO product has a thickness of 3 mm to 15 mm. In another aspect, the MgO product has a thickness of 5 mm to 9 mm. In an aspect, the moisture content of the MgO product is 4 to 15% by weight after curing has occurred. In an aspect, the MgO product can have outer layers. For example, the outer layers can include, but are not limited to, laminate, veneer, melamine, resin paper, vinyl, and/or digital printed ink.

In an aspect, the MgO product contains a magnesium-based binder, a magnesium-based salt, water, and fibers that form a cement board. The magnesium-based binder can include magnesium oxide (MgO). The MgO range from 20% to 50% by weight of the MgO product (by the product, right, or the feedstock). In an aspect, the MgO is in a form of a fine powder. In such instances, the powder form ranges between 50 to 150 microns. In an aspect, the MgO product includes less than 5% of unreacted MgO. In an aspect, the MgO product has a 80 lbf of tensile strength. In an aspect, the MgO product has a 3.5% thickness swell when submerged in water for 24 hours.

The amount of salt and water (in combination a brine) used to ultimately form the MgO product is dependent on the MgO amount, the ultimate characteristics of the product, as well as the type of salt being used to form the brine. However, the ratio between the MgO and brine should range between 0.45 to 1.45 brine/MgO by weight compared to the rest of the feedstock mix. If the water and salts are separated out, the ratio of water to MgO should be between 0.3 to 1. The brine ratio is dependent on the cure temperature and desired board flexibility and tensile strength, as well as the salt used. In an aspect, the combination of MgO and brine results in an 80% yield for the cement.

For example, the salt in the MgO product can include magnesium chloride ($MgCl_2$) an/or magnesium sulfate ($MgSO_4$). If reduced swelling of the final product is desirable, $MgSO_4$ can be utilized by itself (100% $MgSO_4$ results in about a 0.9% water swell). In such instances, the $MgSO_4$ salt to MgO ratio can be approximately 0.1 to 0.5, or $MgSO_4$ brine to MgO of 0.4 to 0.8. If solely $MgCl_2$ is utilized, the $MgCl_2$ salt to MgO ratio can range between 0.1 to 0.5. However, if a MgO product with a good amount of heat and tensile stability, a mixture of $MgCl_2$ and $MgSO_4$ brine should be used, with the $MgSO_4$:$MgCl_2$ ratio of 1.5 to 3.0 being desirable.

In another aspect, various fibers can be used in the MgO product. Fibers can increase the flexibility and rigidity, while decreasing the swelling, of the end MgO product. The fibers can include wood fibers, bamboo fibers, cellulosic fibers, hemp fibers, natural fibers, pecan fibers, synthetic fibers, or any combinations thereof. In an aspect, fibers can make up 30-40% by weight of the MgO product.

In an aspect, a thinner MgO product can be made with fibers while maintaining the MgO product's flexibility and tensile strength. In such instances, it is more desirable to utilize thin and long fibers, as discussed above. For example, a 5 mm thick sample with 30% fiber fill has a tensile strength of 80 lbf. Similarly, a 6 mm thick sample has a tensile strength of 110 lbf, and a 7 mm thick sample having tensile strength of 120 lbf at 30% fiber fill. These values indicate good flexibility and tensile strength. A thinner MgO product is desirable as it reduces the overall weight of the MgO product while maintaining flexibility and tensile strength.

Micro fibrillated fibers or fibers with low amount of lignin or undesirable sugars can be utilized to have thin fibers. In such aspects, the fibers can range between 20 to 50 μm. In an aspect, long fibers can be utilized in the MgO product to increase fiber entanglement, which increases strength. In an aspect, the fibers can range between 1 to 4 mm in length. In some aspects, a MgO product with long fibers can be sandwiched between layers of MgO product using shorter fibers, which prevents telegraphing through surface décor. The combination of long and thin fibers can lead to an increased flexibility, increased rigidity, and more resistance to swelling. Short and thin fibers can be utilized to reduce the number of voids in the final MgO product.

EXAMPLES

Example 1. Properties of Boards Fabricated Using Traditional, Batch Curing Processes Samples of magnesium-oxide based products were fabricated using traditional, batch curing processes. Different sample products were made using a variety of fibers. The different samples with different fibers were then tested to determine performance characteristics of the products. Table 2 below describes the six fibers used in each sample.

TABLE 2

| Fiber | Wood Type | Fiber Processing | Fiber Shape |
|---|---|---|---|
| 1 | Oak and miscellaneous hardwoods fine flour | No additional processing | Large and Round |
| 2 | Pine | Circular saw dust | Long and Skinny |
| 3 | Pine | Bandsaw dust | Long and Round |
| 4 | Mixture of prime softwood species (white spruce, lodgepole pine and subalpine fir) | RP Grinder | Thin filaments |
| 5 | Pine pulp | RP Grinder | Thin filaments |
| 6 | Pine/Poplar dust | No additional processing | Small and round |

Feedstocks component were mixed in a bench mixer according to recipes described herein. The feedstock was then placed on a plate and frame. The surface of the mixture was then evened out before being subjected to pressure and heat. The mixture underwent about 24 hrs on a press before being sanded down and dried. It was then kept at about 100° C. for about 48 hours. All samples were made using the same water/brine/cement ratio and filler loadings. Samples were then subjected to bend tests using ASTM 1037 standards to determine the flexural strengths of the resulting products. Each product sample was about 7 mm in thickness. Strength results are provided in Table 3 below.

TABLE 3

| Total Fiber Weight % | Pine Source | Fiber Description | Density ($kg/m^3$) | 2 day 3-Point Bend (lbf) | 2 day 3-Point Bend (N) |
|---|---|---|---|---|---|
| 30% | Ground Heartwood Pine | Clean, long, and thin | 1660 | 125 | 556 |
| 29% | Ground Heart and Sapwood Pine | Long and thin | 1660 | 105 | 467 |

TABLE 3-continued

| Total Fiber Weight % | Pine Source | Fiber Description | Density (kg/m³) | 2 day 3-Point Bend (lbf) | 2 day 3-Point Bend (N) |
|---|---|---|---|---|---|
| 29% | Full Pine (heart, sap, and bark) | Long, thin, bark contaminant | 1660 | 90 | 401 |
| 30% | Full Pine (heart, sap, and bark) | Long, thin, bark contaminant | 1460 | 75 | 334 |
| 30% | Ground Processed Hardwood | Clean, short, and round | 1570 | 97 | 432 |
| 29% | Ground High Density Fiberboard | Short, round, and resin bound | 1640 | 96 | 427 |
| 29% | Ground Virgin Pulp | Individual micro-fibrillated | 1680 | 155 | 690 |
| 29% | Ground Processed Pulp | Individual micro-fibrillated | 1660 | 179 | 797 |
| 29% | Ground White Paper | White clay bound micro-fibrillated | 1790 | 134 | 596 |
| 29% | Pre-wet Ground Cardboard | Cleaned bound micro-fibrillated | 1710 | 128 | 570 |
| 29% | Ground Cardboard | Bound micro-fibrillated | 1700 | 109 | 485 |

Table 3 shows that a sample product made using ground processed pulp in a traditional, batch curing process produced a desirable 2 day 3-point bend (lbf) test result. Ground processed pulp included micro-fibrillated, lignocellulose fibers not bound by lignin.

Example 2

Seven different fiber sources were tested within product samples using the same formula but alternating the used fiber source. Each different fiber source substituted into the formula showed a decrease in tensile strength of about 50% when the thickness of the product was lowered from about 7 mm to about 5 mm. Results are shown below in Table.

TABLE

| Filler Type (description) | MgCl₂ Brine | MgO | Fibers | Perlite | Thickness (mm) | Density (Kg/m^3) | 3-point Bend (lbf) | Thickness lbf change (%) |
|---|---|---|---|---|---|---|---|---|
| Oak w/lignin (short/wide) | 29% | 40% | 29% | 2% | 7 | 1590 | 92 | — |
| Oak w/lignin (short/wide) | 29% | 40% | 29% | 2% | 5 | 1590 | 44 | 52% |
| Microfibrillated | 29% | 40% | 29% | 2% | 7 | 1710 | 166 | — |
| Microfibrillated | 29% | 40% | 29% | 2% | 5 | 1700 | 75 | 55% |
| Clay Coated Microfib | 29% | 40% | 29% | 2% | 7 | 1790 | 134 | — |
| Clay Coated Microfib | 29% | 40% | 29% | 2% | 5 | 1770 | 73 | 46% |
| Resin Coated Microfib | 29% | 40% | 29% | 2% | 7 | 1640 | 96 | — |
| Resin Coated Microfib | 29% | 40% | 29% | 2% | 5 | 1620 | 52 | 46% |
| Pine w/lignin (Long/skinny) | 29% | 40% | 29% | 2% | 7 | 1660 | 90 | — |
| Pine w/lignin (Long/skinny) | 29% | 40% | 29% | 2% | 5 | 1690 | 48 | 47% |

Results showed that reducing fiber thickness from about 7 mm to about 5 mm reduced tensile strength by about 50%. However, using long and thin fibers increased the tensile strength by at least 1.5× for fibers of the same thickness. Any coating on the fibers reduced strength. Using resin coat reduced strength to a greater degree than other coatings such as clay coatings. The presence of lignin in fibers (e.g., lignin-bound fibers such as pine) with lignin (pine) reduces the tensile strength.

Results additionally showed that micro-fibrillated or long and skinny fibers possessed better tensile strengths than short and wide fibers. The urea formaldehyde resin fibers showed a decrease in strength compared to the control fibers. The resin caused the fibers to bind to themselves. The resin also impacted the fibers' ability to take up water and bind within the cement matrix. Fibers of about 1 mm up to about 4 mm in length showed desirable results. Fibers of about 20 μm up to about 50 μm in width also showed desirable results.

Example 3

Samples of products were exposed to cold and hot presses. Fibers used in the products were micro-fibrillated fibers. Examples are shown in Table 5 below.

TABLE 5

| | MgO % | Brine/ MgO ratio | MgCl2 Brine % | Fiber % | Water % | Perlite % | MgSO4 Salt % |
|---|---|---|---|---|---|---|---|
| MgCl and MgSO4 Mixture | 34% | 1.00 | 16% | 26% | 8% | 5% | 10% |
| | 34% | 1.00 | 16% | 26% | 8% | 5% | 10% |
| MgCl brine only | 37% | 0.82 | 17% | 28% | 13% | 6% | 0% |
| | 37% | 0.82 | 17% | 28% | 13% | 6% | 0% |

| | Press Temp | Press Time | Thickness | 3 point bend (lbf) | lbf % Change from cold to hot press |
|---|---|---|---|---|---|
| MgCl and MgSO4 Mixture | 120 F. | 16 hr | 7.6 | 127 | — |
| | 220 F. | 30 min | 7.6 | 102 | 20% |
| MgCl brine only | 120 F. | 16 hr | 7.3 | 132 | — |
| | 220 F. | 30 min | 7.4 | 87 | 34% |

Results showed decreases in tensile strength when transitioning from hot to cold presses. In an aspect, 80-90% cement crystal formation was observed, via x-ray diffraction, at 120° F.

Example 4

Samples of products according to the present disclosure and a competitor's product were subjected to hot processing. All sample products according to the present disclosure incorporated micro-fibrillated fibers. For context, a normal, non-continuous wet process might use a 1.43:1 brine:MgO ratio or a 0.95:1 water:MgO ratio where brine includes water and a salt. The hot press, continuous process of the present disclosure used here utilized formulas with a brine:MgO ratio ranging from about 0.58:1 to about 0.88:1 or a water: MgO ratio ranging from about 0.45:1 up to about 0.66:1. Results are shown in Table 6 below.

All dry components of a product formula were mixed before being added to the liquid components. The powder was added to a mixer moving at about 140 RPMs up to about 290 RPMs. The powder was added slowly but continuously to the moving mixer via a side spout. This achieved an even saturation of the powder and fibers.

TABLE 6

| Press Temp | Press Time | MgSO4:Water Ratio | Brine:Wood Ratio | MgSO4:MgCl2 Brine Ratio | Water:MgO Ratio | MgCl2 Brine: MgO Ratio | Total Water (%) | Total Powder (%) |
|---|---|---|---|---|---|---|---|---|
| 220 F. | 30 min | 0.00 | 0.48 | 0.00 | 0.35 | 0.46 | 22% | 52% |
| 180 F. | 50 min | 0.30 | 1.37 | 2.17 | 0.35 | 0.46 | 28% | 43% |
| 180 F. | 30 min | 0.30 | 1.37 | 2.17 | 0.35 | 0.46 | 28% | 43% |
| 220 F. | 50 min | 0.30 | 1.37 | 2.17 | 0.35 | 0.46 | 28% | 43% |
| 220 F. | 30 min | 0.27 | 1.40 | 0.00 | 0.35 | 0.46 | 22% | 51% |
| 220 F. | 30 min | 0.26 | 1.33 | 2.18 | 0.35 | 0.46 | 26% | 46% |

| MgO % | MgCl2 Brine % | Fiber % | Water % | Perlite % | MgSO4 Salt % | Thickness | Density (kg/m^3) |
|---|---|---|---|---|---|---|---|
| 48% | 18% | 21% | 10% | 4% | 0% | 7.0 | 1450 |
| 43% | 12% | 19% | 20% | — | 6% | 7.6 | 1550 |
| 43% | 12% | 19% | 20% | — | 6% | 7.5 | 1550 |
| 43% | 12% | 19% | 20% | — | 6% | 6.8 | 1490 |
| 46% | 0% | 20% | 22% | 5% | 6% | 8.1 | 1560 |
| 41% | 11% | 18% | 19% | 5% | 5% | 6.7 | 1480 |

| 3-point bend (lbf) | 24 hr ambient water thickness swell (%) |
|---|---|
| 115 | 3.40% |
| 108 | 2.30% |
| 100 | 2.80% |
| 89 | 2.70% |
| 84 | 0.90% |
| 77 | 0.40% |

The results showed effects that water and temperature had on tensile strength and water stability (e.g., resistance to swelling in the presence of water) of a final product. Water stability including swelling of less than 3.5% is desirable.

The results showed that at 220° F. less water was required according to the first and last rows of Table 5. Increased water reduced the tensile strength of the product at 220° F.

Products using only MgSO$_4$ salt were able to be created, but they had lower tensile strength than when mixed with MgCl$_2$ or when only MgCl$_2$ was used. However, 100% MgSO4 board provides better swell characteristics/dimensional stability.

Table 6 shows that pressing processes at 180° F., compared to 220° F., were able to produce a more stable board with various desirable characteristics including swell, density, and bend strength when using elevated water compositions. Acceptable ranges of swell were below 3.5%, and acceptable bend strengths were above 80 lbf. This showed that swell characteristics were not compromised for bend strength.

Table 6 demonstrated working examples of feedstock components. As a non-limiting example, salt and water were adjusted to correlate with the amount of magnesium oxide. Brine/MgO ratios between 0.45:1 and 1.45:1 were used. Water:MgO ratios between 0.3:1 and 1:1 were used. MgCl$_2$ salt:MgO ratios from about 0.1:1 up to about 0.5:1 were used. MgSO$_4$ salt:MgO ratio from about 0.1:1 up to about 0.5:1 were used. $MgSO_4$ brine:MgO ratio from about 0.4:1 up to about 0.8:1 were used. $MgSO_4$ brine:MgCl2 brine ratios from about 1.5:1 up to about 3.0:1 were used and shown to be advantageous.

Additionally, lower water compositions allowed sample products to not form bubbles in the hot press that might have resulted from evaporation. As such, feedstocks using lower water compositions may be useful for processes involving elevated temperature pressing processes. A water:MgO ratio of about 0.7 was capable of being used in this continuous, hot press process. It was shown to be advantageous to pre-mix MgO powder with fibers when reducing the brine(or water):MgO ratio of product formulas.

Table 6 above shows the mixture of $MgCl_2$ brine's and $MgSO_4$ brine's impact on the product's tensile strength. A 100% $MgCl_2$ brine had a 115 lbf 3-point bend result. A 100% $MgSO_4$ brine had an 84 lbf 3-point bend result.

The results showed that press temperature influenced product strength, as well. Higher temperature required more water to be removed in the feedstock mix prior to pressing. Water:MgO ratios down to about 0.40:1 were capable of being used. An about 0.66:1 water:MgO ratio was capable of being used at about 82° C. Resultant strength was affected due to vapor voids occurring at about 104° C. A water:MgO ratio of about 0.45:1 worked for about 104° C. due to the reduced water amount. Water:MgO ratios of about 0.3:1 have been shown to work.

Results showed that $MgSO_4$ and lower temperature had a big effect on water stability. $MgSO_4$ provided a more stable crystal structure forming better at higher temperatures when compared to $MgCl_2$ crystalline. A formula using 100% $MgSO_4$ as its salt showed a water swell % of about 0.9%. A formula using 100% $MgCl_2$ as its salt showed a water swell % of about 3.4%.

Example 5

Figure 10:
FIG. 10 displays an example of a fiber capable of being incorporated into products according to an aspect of the present disclosure.
Figure 11:
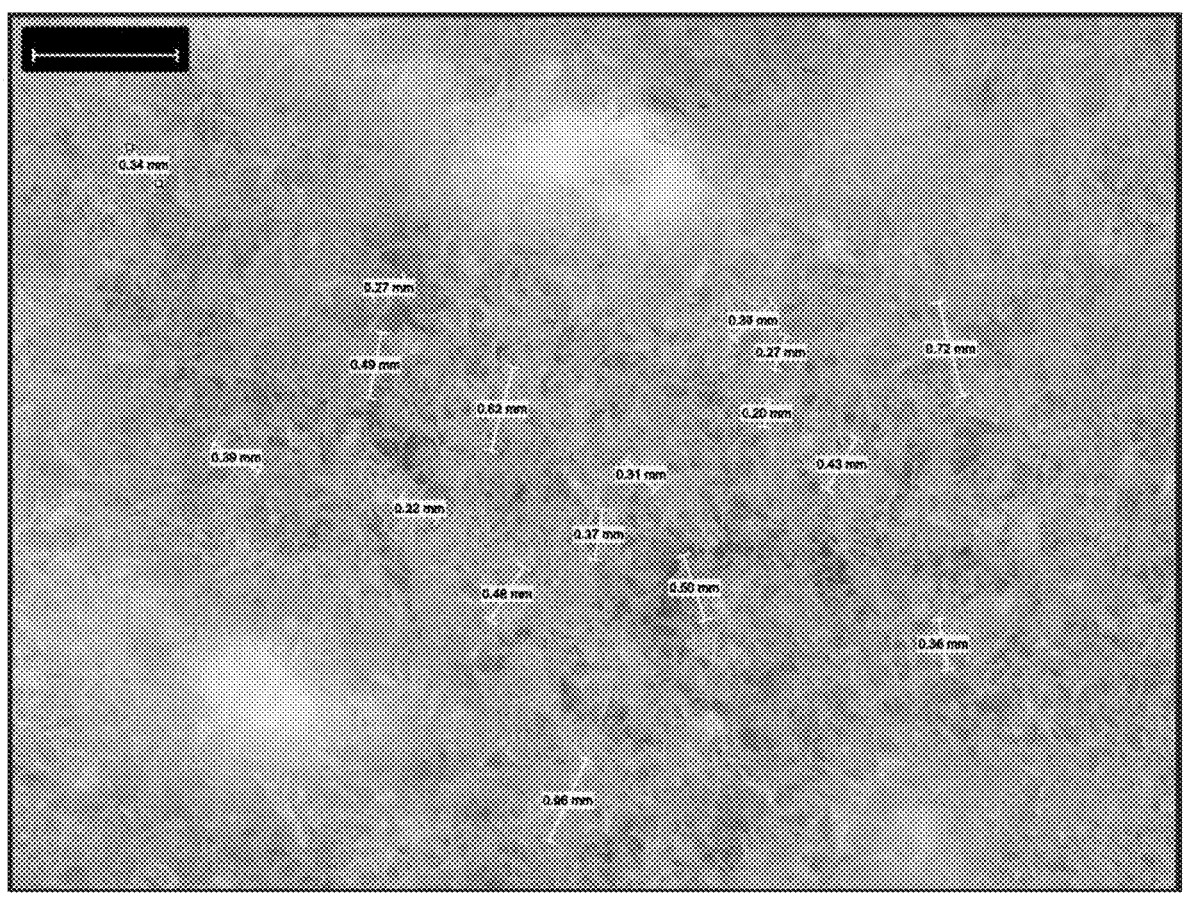
FIG. 11 displays a magnified image of an example fiber according to an aspect of the present disclosure. Representative measurements of the example fiber are included.
Figure 12:
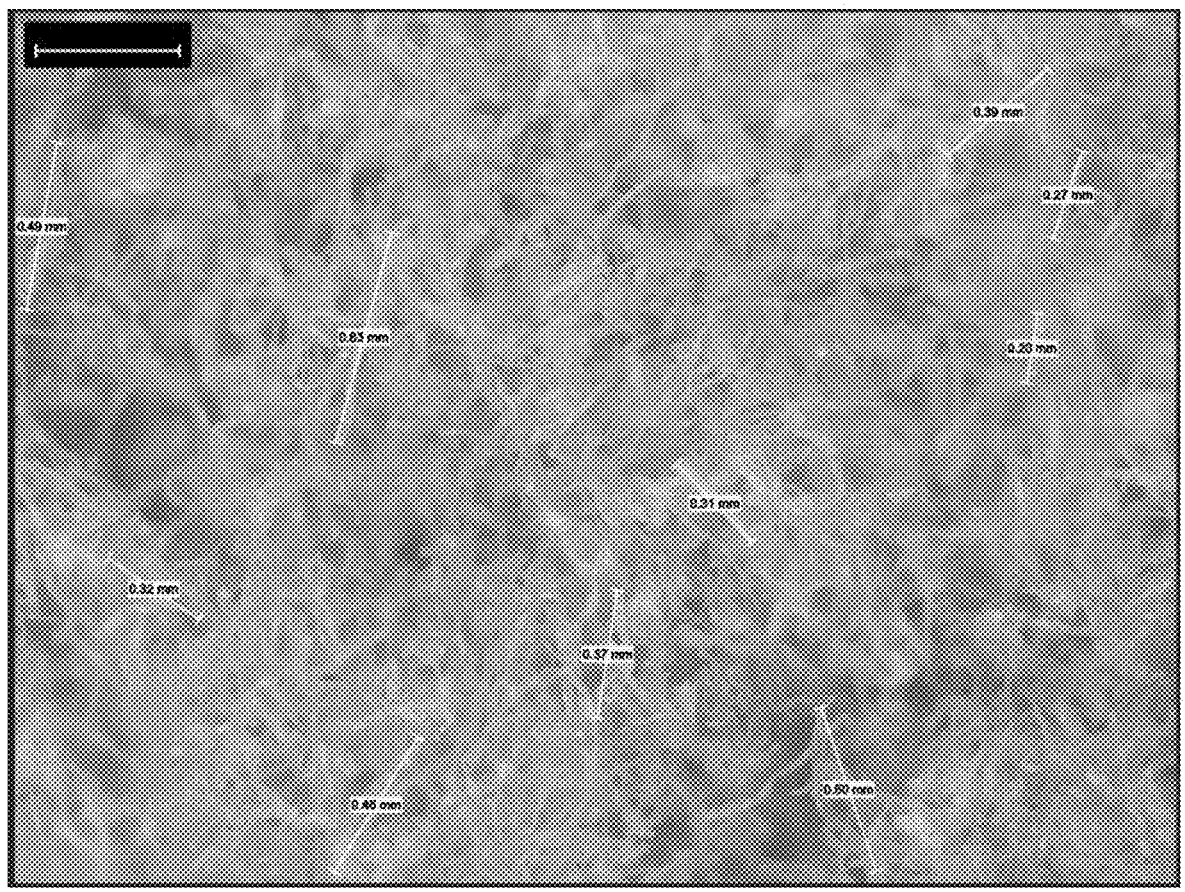
FIG. 12 displays a magnified image of an example fiber according to an aspect of the present disclosure. Representative measurements of the example fiber are included.
Figure 13:
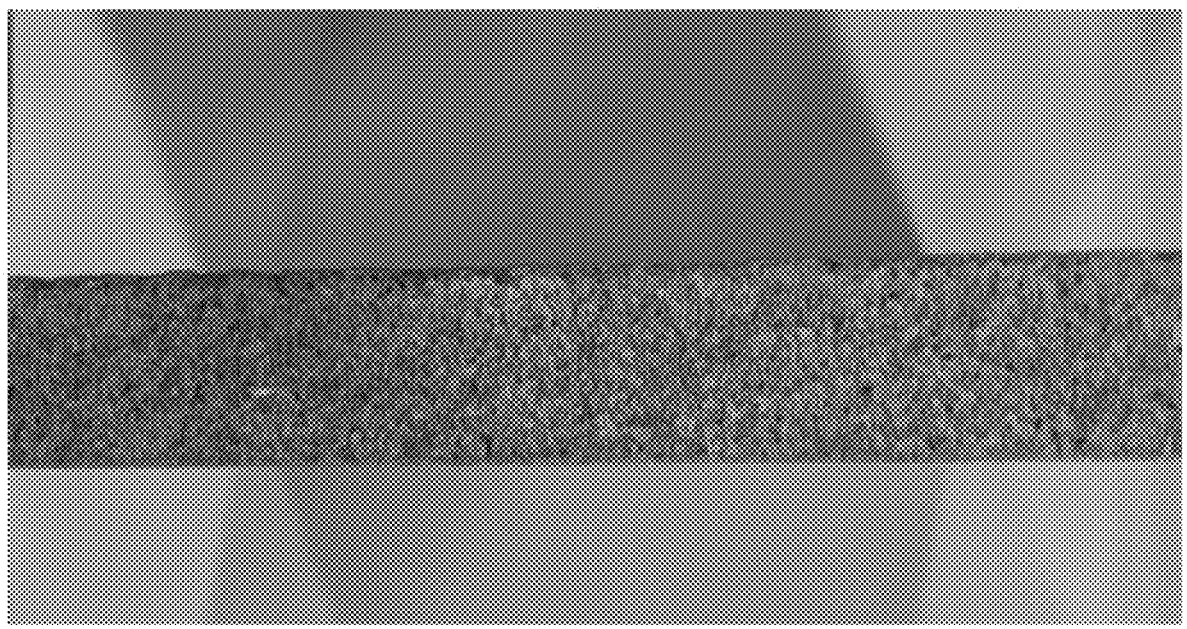
FIG. 13 displays an example of a product according to an aspect of the present disclosure.

In an aspect, a sample product made using fiber 4 from Table 2 produced a desirable 2 day 3-point bend (lbf) test result. This fiber was a fine and fluffy-like powder that appeared micro-fibrillated when viewed under a Scanning Electron Microscope (SEM). Additional 3-point bend tests of products using this fiber also resulted in desirable properties. Such tests consistently produced results above 130 lbf with 30% weight loading. Images of fiber 4 before being incorporated in a sample product are shown in FIGS. 10-12. An example of a sample product using fiber 4 is shown in FIG. 13.

That which is claimed is:

1. A method of producing a magnesium oxide (MgO) based product, the method comprising:
    a. preparing at least one feedstock, wherein the at least one feedstock comprises (MgO), a salt, water, and fibers;
    b. transferring the at least one feedstock to a curing process, wherein the curing process occurs at elevated temperatures ranging between about 68.3° C. up to about 154.4° C. and elevated pressure ranging between about 3 MPa up to about 13 MPa for at least 3 minutes but for no more than 60 minutes, the curing process resulting in the product having a moisture content of about 4% up to about 20%; and
    c. moving the product of the curing process to a drying process.

2. The method of claim 1 wherein the fibers further comprise fibers of varying lengths and thicknesses including wood fibers, bamboo fibers, cellulosic fibers, hemp fibers, natural fibers, pecan fibers, synthetic fibers, or any combinations thereof.

3. The method of claim 1, wherein the fibers comprise fibers of different lengths.

4. The method of claim 1, wherein the curing process uses a double-belt press to apply the elevated pressure.

5. The method of claim 1, wherein the MgO-based product has a thickness from about 3 mm up to about 15 mm.

6. The method of claim 1, further comprising an outer layer application process.

7. The method of claim 6, wherein the outer layer application process comprises applying one or more outer layers to one or more sides of the MgO-based product following the drying process.

8. The method of claim 7, wherein the outer layer is selected from a group consisting of laminate, wood veneer, melamine, phenolic resin paper, melamine-impregnated phenolic resin paper, vinyl, digital printed ink, urethane coatings, stain coatings, and other such materials.

9. The method of claim 6, wherein the outer layer application process and curing process occur simultaneously.

10. The method of claim 9, wherein the outer layer application process comprises applying one or more outer layer(s) to one or more side(s) of the MgO-based product prior to the curing process.

11. The method of claim 10, wherein the one or more outer layer(s) join to the MgO-based product as the product moves through a continuous curing process.

12. The method of claim 1, wherein the drying process comprises subjecting the product, after removal from the curing process, to elevated temperatures ranging between about 60° C. to about 198.9° C. for 30 minutes to about 4 hours.

13. The method of claim 12, wherein the drying process leaves the MgO-based product with a moisture content of about 4% up to about 13%.

14. The method of claim 1, wherein preparing the at least one feedstock comprises forming a dry feedstock.

15. The method of claim 14, wherein preparing the at least one feedstock comprises:
    i. mixing the salt with the water to form an aqueous mixture;
    ii. adding the fibers to the aqueous mixture, wherein the fibers absorb the aqueous mixture to produce saturated fibers; and
    iii. adding the fibers with the absorbed aqueous mixture to the MgO to form the dry feedstock.

16. The method of claim 15, wherein the dry feedstock has an aqueous mixture: MgO ratio of about 0.4 to about 1.5.

17. The method of claim 14, wherein the MgO comprises a fine powder comprising particles ranging between about 50 microns to about 150 microns in size.

18. The method of claim 14, wherein the fibers are pretreated to reduce water absorption.

19. The method of claim 1, wherein after preparing the at least one feedstock, the dry feedstock is sat for about 30 minutes before transferring the dry feedstock to the curing process.

20. The method of claim 1, wherein an amount of water added to the feedstock ranges between about 20% to 50% of weight, resulting in less than about 5% of unreacted MgO in the product after the curing process.

21. The method of claim 1, wherein the fibers comprises a blend of fibers of various surface areas, wherein the blend includes no more than about 70 weight % of fibers with surface area of about 1 mm, about 20 weight % to about 70 weight % of fibers with surface area of about 0.45 mm up to about 0.7 mm, and about 4 weight % up to about 15 weight % of fibers with surface area less than 0.1 mm.

22. The method of claim 1, wherein the product has an initial swell of about 0.50% to about 0.80% as measured by a swello-meter test.

\* \* \* \* \*